US009264368B2

(12) United States Patent
Swarbrick et al.

(10) Patent No.: US 9,264,368 B2
(45) Date of Patent: Feb. 16, 2016

(54) CHIP-TO-CHIP COMMUNICATIONS

(71) Applicant: Marvell World Trade Ltd, St. Michael (BB)

(72) Inventors: Ian Swarbrick, Santa Clara, CA (US); Joseph Jun Cao, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 452 days.

(21) Appl. No.: 13/752,050

(22) Filed: Jan. 28, 2013

(65) Prior Publication Data

US 2013/0195210 A1 Aug. 1, 2013

Related U.S. Application Data

(60) Provisional application No. 61/591,693, filed on Jan. 27, 2012, provisional application No. 61/596,905, filed on Feb. 9, 2012, provisional application No. 61/717,978, filed on Oct. 24, 2012.

(51) Int. Cl.
| | |
|---|---|
| *H04L 12/851* | (2013.01) |
| *H04L 29/06* | (2006.01) |
| *H04L 12/863* | (2013.01) |
| *H04L 25/02* | (2006.01) |
| *G06F 13/42* | (2006.01) |

(52) U.S. Cl.
CPC .............. *H04L 47/24* (2013.01); *G06F 13/423* (2013.01); *H04L 25/02* (2013.01); *H04L 47/6215* (2013.01); *H04L 69/22* (2013.01)

(58) Field of Classification Search
CPC . H04L 49/508; H04L 49/552; H04L 49/9047; H04L 47/24; H04L 47/6215; H04L 69/22
See application file for complete search history.

(56) References Cited

U.S. PATENT DOCUMENTS

| 8,418,017 | B2 * | 4/2013 | Tsao et al. ..................... 714/749 |
|---|---|---|---|
| 2006/0090014 | A1 * | 4/2006 | Wong et al. ..................... 710/10 |
| 2007/0005913 | A1 | 1/2007 | Muthrasanallur et al. |
| 2009/0010279 | A1 * | 1/2009 | Tsang et al. .................. 370/468 |
| 2009/0086735 | A1 | 4/2009 | Tsang |
| 2011/0286422 | A1 * | 11/2011 | Radulescu .................... 370/329 |

FOREIGN PATENT DOCUMENTS

| WO | WO2009027301 A1 | 3/2009 |
|---|---|---|
| WO | WO2009090255 A2 | 7/2009 |

OTHER PUBLICATIONS

International Application No. PCT/IB2013/000300, Notification of Transmittal of the International Search Report and the Written Opinion of the International Searching Authority, Date of Mailing Jun. 5, 2013, 11 pages.

* cited by examiner

*Primary Examiner* — Omer S Mian

(57) ABSTRACT

Devices and systems are described for transmitting data packets over a chip-to-chip communications link. For example, a device includes a hardware replay buffer to store a data packet. The data packet includes an overhead portion and a payload portion. Additionally, the transmitter device includes circuitry configured to record a memory location within the hardware replay buffer corresponding to an interruption in transmission to a receiver device of the payload portion of the data packet through a physical serial communications link. The memory location references an intermediate location of the payload portion of the data packet.

18 Claims, 8 Drawing Sheets

CHIP-TO-CHIP COMMUNICATIONS

CROSS-REFERENCE TO RELATED APPLICATIONS

This disclosure claims benefit of the following provisional applications: Provisional Application No. 61/591,693, filed on Jan. 27, 2012; Provisional Application No. 61/596,905, filed on Feb. 9, 2012; and Provisional Application No. 61/717,978, filed on Oct. 24, 2012. The entire contents of each of these priority applications are hereby incorporated by reference.

BACKGROUND

The subject matter of this disclosure is generally related to transfer of data over a serial chip-to-chip communications link, for example to combine low latency data traffic with high bandwidth data traffic over the serial chip-to-chip communications link.

A Serializer/Deserializer (SerDes) link, also referred to as a serial communications link, includes a pair of functional modules commonly used in high speed communications to compensate for limited input/output pins between chips. These functional modules convert data between serial data and parallel interfaces in each direction. A packet of data that is transmitted through the serial communications link includes overhead and a data payload. The overhead includes a start and end symbol to identify the packet, and a cyclic redundancy code (CRC) value that is used to check the integrity of the transmitted packet.

A low latency (LL) virtual channel and one or more bandwidth (BW) virtual channels can be established through the serial communications link. In this manner, multiple packets are transmitted through a BW virtual channel without interruption. When a particular packet is received to be immediately transmitted through the serial communications link, the particular packet is prepared for transmission on the LL virtual channel. However, the particular packet needs to wait until transmission through the BW virtual channel of a current packet ends. This increases the latency of transmissions through the LL virtual channel. Once the transmission through the BW virtual channel of a current packet ends, the particular packet is transmitted through the LL virtual channel. When the transmission through the LL virtual channel of the particular packet ends, transmission of the multiple packets through the BW virtual channel resumes with a subsequent one from the multiple packets.

SUMMARY

Devices and systems described in this specification use interrupting of fragment transmissions and chaining of fragments of interrupted data packets to allow low latency and high bandwidth traffic to coexist on a serial communications link configured with an LL virtual channel and one or more BW virtual channels. For example, the above-noted additional latency for the particular packet can be reduced by fragmenting the multiple packets to be transmitted on the BW virtual channel into smaller packets (referred to as fragments). However, simply fragmenting the multiple packets to be transmitted through the BW virtual channel can reduce the throughput thereof due to fragmentation overhead. In accordance with the disclosed technologies, when the particular packet is received for transmission on the LL virtual channel, the currently transmitted BW packet is terminated early. The particular packet will then be sent through the LL virtual channel. When transmission of the particular packet through the LL virtual channel ends, transmission of a new packet, which contains the remaining un-transmitted data from the BW packet, begins on the BW virtual channel. The new packet is chained to the early terminated packet in the following manner: instead of creating a new full packet header, a single chain bit is used to indicate that the new packet is a continuation of a previous packet which has been partially transmitted on the BW virtual channel. In this manner, the chip-to-chip communications link described in this specification enables low latency traffic on the LL virtual channel to be combined with high bandwidth traffic on the one or more BW virtual channels.

One aspect of the subject matter described in this specification can be implemented in a transmitter device that includes a hardware replay buffer to store a data packet. The data packet includes an overhead portion and a payload portion. Additionally, the transmitter device includes circuitry configured to record a memory location within the hardware replay buffer corresponding to an interruption in transmission to a receiver device of the payload portion of the data packet through a physical serial communications link. The memory location references an intermediate location of the payload portion of the data packet.

Implementations can include one or more of the following features. In some implementations, the memory location corresponding to the interruption can include an offset into the hardware replay buffer indicating a stored bit of the payload portion that was not yet transmitted as of the interruption. In some implementations, the circuitry can include a register where the circuitry records the memory location corresponding to the interruption. For example, the register includes a replay start register, and the circuitry to record includes (i) a current transmission location register, (ii) the replay start location register, and (iii) an end of payload portion location register. In this manner, the circuitry to record is configured to transfer a value stored in the current transmission location register to the replay start register at a time of the interruption.

In some implementations, the circuitry can resume the transmission to the receiver device of the payload portion starting from the recorded memory location corresponding to the interruption. For example, the circuitry transmits, to the receiver device immediately prior to resumption of the transmission of the payload portion, one or more overhead bits indicating to the receiver device that remainder data of the payload portion is to be received. In some implementations, the circuitry causes the interruption in the transmission of the payload portion in response to receipt from a host of a higher priority data packet to be transmitted to the receiver device through the physical serial communications link prior to completion of the transmission of the payload portion. In this case, the circuitry resumes the transmission of the payload portion after completion of a transmission of the higher priority data packet. In some implementations, the circuitry causes the interruption in the transmission of the payload portion in response to receipt of a message from the receiver device through a physical back communications link requesting the interruption of the transmission of the payload portion. In this case, the circuitry resumes the transmission of the payload portion after a predetermined time since the receipt of the message from the receiver.

Another aspect of the subject matter described in this specification can be implemented in a system that includes a physical communications link through which data packets are transmitted from a first integrated circuit (IC) device to a second IC device. Each of the data packets includes an overhead portion and a payload portion. The system also includes a transmitter to obtain a data packet from the first IC device and to transmit the data packet through the physical communications link. The transmitter includes a hardware replay buffer to store the payload portion of the data packet during transmission of the data packet through the physical communications link, and transmitter circuitry configured to record a memory location within the hardware replay buffer corresponding to an interruption in the transmission. Further, the system includes a receiver to receive the data packet transmitted through the physical communications link and to provide the data packet to the second IC device. The receiver includes a hardware receiver buffer to store the data packet transmitted through the physical communications link, and receiver circuitry configured to count a quantity of bits received as part of the payload portion and to record the count.

Implementations can include one or more of the following features. In some implementations, the memory location corresponding to the interruption can include an offset into the hardware replay buffer indicating a stored bit of the payload portion that was not yet transmitted as of the interruption. In some implementations, the transmitter circuitry can include a register where the transmitter circuitry records the memory location corresponding to the interruption. In some implementations, the transmitter circuitry can cause the interruption of the transmission of the payload portion once a predetermined fraction of the payload portion is transmitted through the physical communications link after receipt of an instruction requesting the interruption.

In some implementations, the transmitter circuitry can resume the transmission of the payload portion of the data packet starting from the recorded memory location corresponding to the interruption. For example, the transmitter circuitry transmits, prior to the transmission of the payload portion, the overhead portion specifying a total bit count of the payload portion, and transmits, prior to resumption of the transmission of the payload portion, one or more overhead bits indicating to the receiver that remainder of the payload portion is to be received. In this example, the receiver circuitry compares the recorded count to the specified total bit count in response to receipt of the one or more overhead bits indicating that the remainder of the payload portion is to be received.

In some implementations, the transmitter circuitry can cause the interruption in the transmission of the payload portion in response to receipt from the first IC device of a higher priority data packet to be transmitted to the receiver through the physical communications link prior to completion of the transmission of the payload portion, and can resume the transmission of the payload portion after completion of a transmission of the higher priority data packet through the physical communications link. In this case, the transmitter includes a second hardware replay buffer different from the hardware replay buffer to store a payload portion of the second data packet during transmission of the second data packet through the physical communications link, and the receiver includes a second hardware receiver buffer different from the hardware receiver buffer to store the payload portion of the second data packet during transmission of the second data packet transmitted through the physical communications link. Further in this case, the hardware receiver buffer and the second hardware receiver buffer are mapped to memory address space associated with the second IC device. In this manner, the transmitter circuitry transmits, prior to the transmissions of the payload portions of the packet and the second packet, the respective overhead portions of the packet and the second packet specifying respective addresses associated with the second IC device.

Furthermore, the system can include a physical back communications link through which the data packets are transmitted from the second IC device to the first IC device.

Also, the system can include a second transmitter to obtain a third data packet and a fourth data packet from the second IC device and to transmit the third and fourth data packets through the physical back communications link. The second transmitter can include a third hardware replay buffer to store a payload portion of the third data packet during transmission of the third data packet through the physical back communications link, and a fourth hardware replay buffer different from the third hardware replay buffer to store a payload portion of the fourth data packet during transmission of the fourth data packet through the physical back communications link. Moreover, the second transmitter can include second transmitter circuitry to (i) cause an interruption in the transmission of the payload portion of the third data packet in response to receipt from the second IC device of the fourth data packet to be transmitted through the physical back communications link prior to completion of the transmission of the payload portion of the third data packet, (ii) record a memory location within the third hardware replay buffer corresponding to the interruption in the transmission of the third data packet, and (iii) resume the transmission of the payload portion of the third data packet after completion of a transmission of the fourth data packet.

Additionally, the system can include a second receiver to receive the third and fourth data packets transmitted through the physical back communications link and to provide the third and fourth data packets to the first IC device. The second receiver can include a third hardware receiver buffer to store the third data packet transmitted through the physical back communications link, and a fourth hardware receiver buffer to store the fourth data packet transmitted through the physical back communications link. In this case, the third and fourth hardware receiver buffers are mapped to memory address space associated with the first IC device. In addition, the second receiver can include second receiver circuitry to count another quantity of bits received as part of the payload portion of the third data packet and to record the other count. In this manner, the second transmitter circuitry can transmit, prior to the transmission of the payload portions of the third and fourth packets, the respective overhead portions of the third and fourth packets specifying respective addresses associated with the first IC device.

In some implementations, the system can include a physical back communications link through which a message is transmitted from the receiver to the transmitter. In this case, the transmitter circuitry can cause the interruption in the transmission of the payload portion in response to receipt of the message from the receiver. For example, the receiver transmits the message requesting the interruption of the transmission of the payload portion when a fill level of the hardware receiver buffer exceeds a predetermined level, and the transmitter circuitry resumes, after a predetermined time since the interruption, the transmission of the payload portion starting from the recorded memory location corresponding to the interruption. As another example, the receiver transmits the message requesting (i) the interruption of the transmission of the payload portion and (ii) retransmission of a part of the payload portion transmitted before the interruption when an error is detected in the part of the payload portion transmitted before the interruption. Additionally in this example, the transmitter circuitry retransmits the part of the payload portion transmitted before the interruption, and then, absent a message obtained from the receiver within a predetermined time interval requesting retransmission of the payload portion, clears the hardware replay buffer.

One or more of the following advantages can be realized. The chip-to-chip communications link described in this specification supports both low latency and high throughput data traffic. The disclosed communications link can be scaled up to high throughput because it uses high speed and is based on multiple lanes (virtual channels). Moreover, the disclosed chip-to-chip communications link can consume less power than conventional chip-to-chip communications links by using an automatic power management protocol and by having low active power. The power management protocol is configured to provide fast exit from low power states and independent low power states in both directions.

In addition, the disclosed technologies can optimize chip cost versus performance. For instance, utilization of memory buffers, on both transmitter and receiver chips, can be optimized to minimize a size of the buffers of the chips. For example, implementation of low latency of NACK responses and of flow control minimizes buffer lifetime to increase storage efficiency. In this manner, efficient use of the on-chip memory buffers allows for a low cost implementation of virtual channels, which in turn enable differential quality of service, QoS (e.g., transmissions of LL and BW packets,) through the communications link.

Moreover, the disclosed technologies can be used to implement a given chip-to-chip communications link for which a 32 byte cache line read latency (req/resp) is 48 ns/48 ns at a gen3 transmission rate of 8 GBits/sec. Further, the given chip-to-chip communications link supports a peak bandwidth of 32×8 GBits/sec=256 GBits/sec. Furthermore, the given chip-to-chip communications link is bandwidth sensitive, such that a 256 Byte write throughput is approximately 95%, or approximately 243 GBits/sec.

Additionally, the given chip-to-chip communications link provides mixed latency and bandwidth. For example, when a chip A does 200 MB/sec cache line fills from chip B, and chip B does a maximum number 256 byte writes to chip A, the bandwidth and latency values of the given chip-to-chip communications link are approximately 616 Mbytes/sec and 280 ns, respectively. As another example, when the normalized link BW is 1 GBytes/sec, the bandwidth value is approximately 582 Mbytes/sec and the latency range is 10-20 ns.

The details of one or more embodiments of the invention are set forth in the accompa-nying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
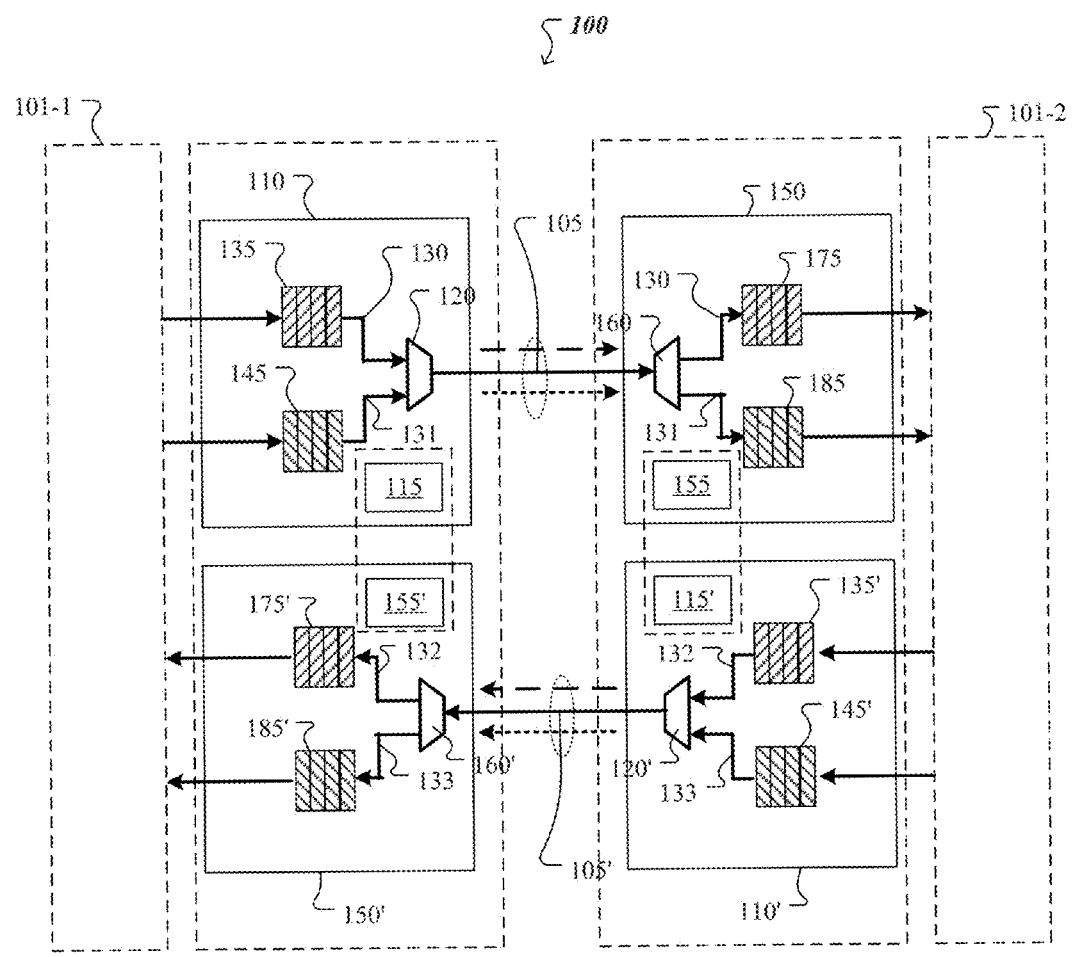
FIG. 1 shows an example of a serial communications link including a low latency virtual channel and a bandwidth virtual channel.

Systems and techniques are described for providing chip-to-chip communications that have high throughput and low latency at low-cost. The high throughput and low latency aspects enable a master device and a slave device, which are part of a system-on-a-chip (SoC) and reside on separate chips, which are coupled using the disclosed technologies, to communicate as if they virtually resided on the same chip. Moreover, the low cost aspect can be accomplished by using a small quantity of small size on-chip memory buffers, for instance.

Some conventional chip-to-chip communications links are configured to have low latency in order to enable fast cache line fill and chip-to-chip synchronization. Other conventional chip-to-chip communications links are configured to carry bulk data traffic with high throughput. In this specification, a chip-to-chip communications link is configured to accommodate both low latency data traffic and bulk data traffic on the same link. In this manner, low-latency for sensitive traffic and high overall throughput can be maintained for best utilization of link bandwidth.

Other considerations also have been taken into account when configuring the chip-to-chip communications link described in this specification, such as managing power characteristics of the link's physical layer based on a power protocol, handling memory addresses in a unified manner between chips coupled through the link, and maintaining high reliability of communications through the link, for instance. In addition, SoC integration considerations have been taken into account when configuring the disclosed chip-to-chip communications link such as interrupt handling, ordering based on a software (SW) model, error handling, and cleanly transporting advanced microcontroller bus architecture (AMBA) protocols through the link, for example. These and other aspects of the proposed technologies are described below in this specification.

In some implementations, a communications link between two chips is configured with two or more virtual channels (VC). Such a configuration allows the disclosed communications link to prevent blocking of low latency, sensitive traffic and to provide differential quality of service (QoS) for the chip-to-chip communications carried through the link. Additionally, transaction layer packets (TLPs) to be transferred between the two chips in accordance to the disclosed technologies are divided, prior to transmission, into fragments that are chained together. By fragmenting the TLPs and chaining the resulting fragments, the chip-to-chip communications link described in this specification can achieve very low latency for critical word fetch on a low-latency (LL) virtual channel of the link, and achieve high throughput with minimal buffering through one or more bandwidth (BW) channels.

Packets to be transmitted on the LL virtual channel can interrupt packets currently being transmitted on one of the BW channels. For example, when such an interruption request to transmit an LL packet is received, current transmission of a fragment of a BW data packet through the BW virtual channel is terminated early, prior to completing the transmission of the entire fragment. For instance, cyclic redundancy code (CRC) can be appended to a data location associated with the requested transmission interruption to end the transmitted portion of the fragment. Transmission through the BW virtual channel of the remaining portion of the interrupted fragment of the BW data packet is resumed once the LL packet has been transmitted. In this manner, the chip-to-chip communications link described in this specification can sustain very low latency traffic through the LL virtual channel while maintain high throughput on the one or more BW virtual channels.

Data transmitted through the one or more BW virtual channels (especially when there are multiple BW virtual channels) may not be received at link rate. For this reason, threshold logic is implemented at the receiver side of the communications link for the BW virtual channels to gather up write data and/or read responses, or both. The threshold logic need not be implemented for the LL virtual channel, because fragments are sent through the LL virtual channel as soon as they can be sent.

In general, an IDLE command is used in chip-to-chip communications to immediately terminate input from, or output to, physical terminals assigned to lines, logical links, or nodes specified in the IDLE command. In conventional communication protocols, partially processed input messages on the lines specified in the IDLE command are discarded, and output messages being sent are returned to the message queues for later transmission. In the case of the chip-to-chip communications link described in this specification, a logical IDLE symbol can be inserted even while transmitting a packet, without having to wait for the transmission of the packet to be completed. This reduces the need to store-and-forward a packet that was interrupted by an IDLE command, and in this manner reduces elastic buffer latency.

Further, the chip-to-chip communications link described in this specification supports full transport of the on-chip fabric protocol, e.g., of the advanced eXtensible interface (AXI) protocol of AMBA. In this manner, SoC integration and interoperability can be provided. Furthermore, the disclosed technologies support AXI ordering rules, and as such, can be used to configure a unified two-chip solution.

FIG. 1 shows a schematic of a system 100 implemented based on the disclosed technologies. The system 100 includes a physical communications link 105 through which data packets are transmitted from a first integrated circuit (IC) device 101-1 to a second IC device 101-2. Each of the data packets transmitted through the physical communications link includes an overhead portion and a payload portion. Examples of data packet formats, including content of overhead portions, are described below in connection with FIGS. 5, 7 and 8. Further, the system 100 includes a transmitter device 110 (or simply a transmitter 110) to obtain a data packet from the first IC device 101-1 and to transmit the data packet through the physical communications link 105. Furthermore, the system 100 includes a receiver device 150 (or simply a receiver 150) to receive the data packet transmitted through the physical communications link 105 and to provide the data packet to the second IC device 101-2. The physical communications link 105 can be implemented as a wire, e.g., a trace or lead on a substrate, that connects the transmitter 110 with the receiver 150. Example implementations of physical communications links are described below in this specification.

In some implementations, the first IC device 101-1 includes the transmitter 110 and together form a SoC. In other implementations, the first IC device 101-1 is located on a chip that is communicatively coupled with another chip on which the transmitter 110 is located. Similarly, in some implementations, the second IC device 101-2 includes the receiver 150 and together form a SoC. In other implementations, the second IC device 101-2 is located on a chip that is communicatively coupled with another chip on which the receiver 150 is located. Moreover, in some other implementations, a chip on which the transmitter 110 is located and another chip on which the receiver 150 is located are both part of a SoC. In yet some other implementations, the first IC device 101-1 or the second IC device 101-2 or both are part of the same SoC as the transmitter 110 and the receiver 150.

Figure 2:
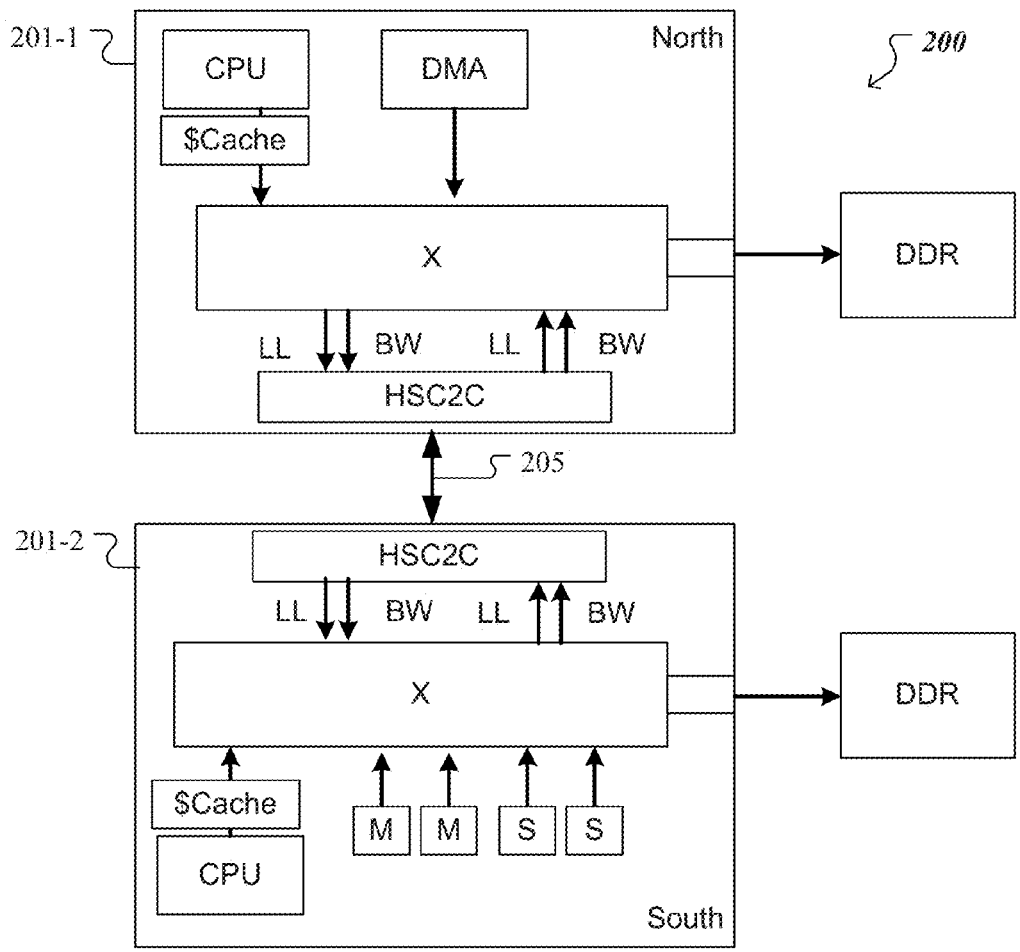
FIG. 2 shows an example of a serial communications link implemented between a north chip and a south chip.
Figure 3A:
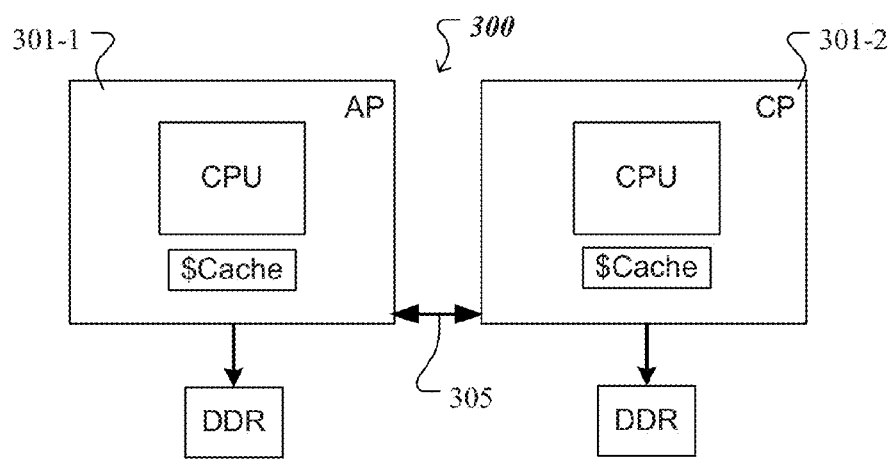
FIGS. 3A-3B show aspects of an example of a serial communications link implemented between an application processor and a modem processor.

FIG. 2 shows an example of a system 200 implemented in accordance with the disclosed technologies. The system 200 includes a chip-to-chip communications link 205 between a north chip 201-1 and a south chip 201-2 of a motherboard. In some implementations, the north chip 201-1 can be configured to manage video graphics, and the south chip 201-2 can be configured to manage an I/O interface, e.g., a USB (Universal Serial Bus), PCIe or SATA (Serial Advanced Technology Attachment) interface. FIG. 3A shows an example of a system 300 implemented in accordance with the disclosed technologies. The system 300 includes a chip-to-chip communication link 305 between an application processor (AP) 301-1 and a communications processor (CP) 301-2. The latter can be a modem or baseband processor, for instance.

Referring again to FIG. 1, the transmitter 110 includes a hardware replay buffer 145 and a transmitter controller 115 (also referred to as transmitter circuitry 115.) The receiver 150 includes a hardware receiver buffer 185 and a receiver controller 155 (also referred to as receiver circuitry 155.) The hardware replay buffer 145 is configured to store the payload portion of the data packet during transmission of the data packet through the physical communications link 105, and the hardware receiver buffer 185 is configured to store the data packet transmitted through the physical communications link 105.

In addition, the transmitter circuitry 115 is configured to record a memory location within the hardware replay buffer 145 corresponding to an interruption in the transmission through the physical communications link 105. In some implementations, the memory location corresponding to the interruption includes an offset into the hardware replay buffer 145 indicating a stored bit of the payload portion that was not yet transmitted as of the interruption. In some implementations, the transmitter circuitry 115 includes a register where the transmitter circuitry 115 records the memory location corresponding to the interruption. For example, the register includes a replay start register. In some cases, the transmitter circuitry 115 includes a current transmission location register, the replay start location register, and an end of payload portion location register. Here, the transmitter circuitry 115 transfers a value stored in the current transmission location register to the replay start register at a time of the interruption.

The transmitter circuitry 115 can resume the transmission of the payload portion of the data packet starting from the recorded memory location corresponding to the interruption. Moreover, the transmitter circuitry 115 transmits, prior to the transmission of the payload portion, the overhead portion specifying a total bit count of the payload portion, and the receiver circuitry 155 saves the total bit count expected to be received as part of the packet transmission. In addition, the receiver circuitry 155 is configured to count a quantity of bits received as part of the payload portion and to record the count. In this manner, the transmitter circuitry 115 transmits, prior to resumption of the transmission of the payload portion, one or more overhead bits indicating to the receiver 150 the remainder of the payload portion that is to be received, and the receiver circuitry 155 compares the recorded count to the specified total bit count in response to receipt of the one or more overhead bits indicating that the remainder of the payload portion is to be received.

In some implementations, the transmitter circuitry 115 can cause the interruption in the transmission of the payload portion in response to receipt from the first IC device 101-1 of a second data packet to be transmitted to the receiver 150 through the physical communications link 105 prior to completion of the transmission of the payload portion. Moreover, the transmission of the payload portion can be resumed by the transmitter circuitry 115 after completion of a transmission of the second data packet through the physical communications link 105. In this case, the transmitter 110 includes a second hardware replay buffer 135 different from the hardware replay buffer 145 to store a payload portion of the second data packet during transmission of the second data packet through the physical communications link 105. Also in this case, the receiver 150 includes a second hardware receiver buffer 175 different from the hardware receiver buffer 185 to store the payload portion of the second data packet during transmission of the second data packet transmitted through the physical communications link 105.

Transmission of the data packet is performed through a virtual channel 131 of the physical communications link 105 dedicated to a first type of data traffic (e.g., BW traffic) and transmission of the second data packet is performed through another virtual channel 130 of the physical communications link 105 dedicated to a second type of data traffic (e.g., LL traffic.) Here, the virtual channels 130, 131 are logical channels (as opposed to physical channels) that each run through a respective hardware replay buffer 135, 145 of the transmitter 110, the physical link 105 and a respective hardware receiver buffer 175, 185 of the receiver 150. For example, the first type of traffic has lower priority than the priority of the second type of traffic. Additionally, the first type of traffic includes data packets having a larger size compared to the data packets included in the second type of traffic. The transmitter 110 includes a switching device 120 (e.g., multiplexer) configured to switch between transmitting BW data packets through the virtual channel 131 to transmitting LL data packets through the virtual channel 130. Further, the receiver 150 includes a second switching device 160 (e.g., de-multiplexer) to switch between receiving BW data packets through the virtual channel 131 to receiving LL data packets through the virtual channel 130.

In some implementations, the hardware receiver buffer 185 and the second hardware receiver buffer 175 can be mapped to memory address space associated with the second IC device 101-2. In this case, the transmitter circuitry 115 transmits, prior to the transmissions of the payload portions of the packet and the second packet, the respective overhead portions of the packet and the second packet specifying respective addresses associated with the second IC device 101-2.

In addition, the system 100 can include a physical back communications link 105' through which the data packets are transmitted from the second IC device 101-2 to the first IC device 101-1. In this case, the system 100 also includes a second transmitter 110' to obtain a third data packet and a fourth data packet from the second IC device 101-2 and to transmit the third and fourth data packets through the physical back communications link 105', and a second receiver 150' to receive the third and fourth data packets transmitted through the physical back communications link 105' and to provide the third and fourth data packets to the first IC device 101-1. The physical communications link 105' can be implemented as a wire, e.g., a trace or lead on a substrate, that connects the second transmitter 110' with the second receiver 150'.

In some implementations, the first IC device 101-1 includes the transmitter 110 and the second receiver 150', and all three devices together form a SoC. In other implementations, the first IC device 101-1 is located on a chip that is communicatively coupled with another chip on which the transmitter 110 and the second receiver 150' are located. Similarly, in some implementations, the second IC device 101-2 includes the receiver 150 and the second transmitter 110', and all three devices together form a SoC. In other implementations, the second IC device 101-2 is located on a chip that is communicatively coupled with another chip on which the receiver 150 and the second transmitter 110' are located. Moreover, in some other implementations, a chip on which the transmitter 110 and the second receiver 150' are located and another chip on which the receiver 150 and the second transmitter 110' are located are both part of a SoC. In yet some other implementations, the first IC device 101-1 or the second IC device 101-2 or both are part of the same SoC as the transmitters 110, 110' and the receivers 150, 150'.

The second transmitter 110' includes a third hardware replay buffer 145', a fourth hardware replay buffer 135' different from the third hardware replay buffer 145', and a second transmitter controller 115' (also referred to as second transmitter circuitry 115'.) The third hardware replay buffer 145' is configured to store a payload portion of the third data packet during transmission of the third data packet through the physical back communications link 105'. The fourth hardware replay buffer 135' is configured to store a payload portion of the fourth data packet during transmission of the fourth data packet through the physical back communications link 105'. The second receiver 150' includes a third hardware receiver buffer 185', a fourth hardware receiver buffer 175', and a second receiver controller 155' (also referred to as second receiver circuitry 155'.) The second receiver circuitry 155' is configured to count another quantity of bits received as part of the payload portion of the third data packet and to record the other count. Moreover, the third hardware receiver buffer 185' is configured to store the third data packet transmitted through the physical back communications link 105'. The fourth hardware receiver buffer 175' is configured to store the fourth data packet transmitted through the physical back communications link 105'. In some implementations, the transmitter controller 115 and the second receiver controller 155' are co-located on a same chip, and the receiver controller 155 and the second transmitter controller 110' are co-located on another chip.

The second transmitter circuitry 115' is configured to cause an interruption in the transmission of the payload portion of the third data packet in response to receipt from the second IC device 101-2 of the fourth data packet to be transmitted through the physical back communications link 105' prior to completion of the transmission of the payload portion of the third data packet. At this time, a memory location within the third hardware replay buffer corresponding to the interruption in the transmission of the third data packet is recorded by the second transmitter circuitry 115'. After completion of a transmission of the fourth data packet, the second transmitter circuitry 115' resumes the transmission of the payload portion of the third data packet through the physical back communications link 105'.

In analogy to the virtual channels 130, 131 of the physical communications link 105, transmission of the third data packet is performed through a virtual channel 133 of the physical back communications link 105' dedicated to the first type of data traffic (e.g., BW traffic) and transmission of the fourth data packet is performed through another virtual channel 132 of the physical back communications link 105' dedicated to the second type of data traffic (e.g., LL traffic.) Once again, the virtual channels 132, 132 are logical channels (as opposed to physical channels) that each run through a respective replay buffer 135', 145' of the transmitter 110', the physical back link 105' and a respective receiver buffer 175', 185' of the second receiver 150'. Additionally, the second transmitter 110' includes a third switching device 120' (e.g., multiplexer) configured to switch between transmitting BW data packets through the virtual channel 133 to transmitting LL data packets through the other virtual channel 132. Further, the second receiver 150' includes a fourth switching device 160' (e.g., de-multiplexer) to switch between receiving BW data packets through the virtual channel 133 to receiving LL data packets through the virtual channel 132.

In some implementations, the third and fourth hardware receiver buffers 185', 175' can be mapped to memory address space associated with the first IC device 101-1. In this case, the second transmitter circuitry 115' transmits, prior to the transmission of the payload portions of the third and fourth packets, the respective overhead portions of the third and fourth packets specifying respective addresses associated with the first IC device 101-1.

In some implementations, the receiver 150 can instruct the second transmitter circuitry 115' to transmit a message through the physical back communications link 105', such that the transmitter circuitry 115 causes the interruption in the transmission of the payload portion in response to receipt of the message from the receiver 150. The message is sent on the virtual channel 132 that is dedicated to the LL traffic of the physical back communications link 105'. This message can interrupt, if necessary, a current transmission of a BW data packet on the virtual channel 133 that is dedicated to the lower priority, BW traffic of the physical back communications link 105'.

For example, the message transmitted on the virtual channel 132 of the physical back communications link 105' on behalf of the receiver 150 requests the interruption of the transmission of the payload portion of the data packet on the BW channel 131 of the physical communications link 105, when a fill level of the hardware receiver buffer 185 exceeds a predetermined level. In this case, the transmitter circuitry 115 resumes, after a predetermined time since the interruption, the transmission of the payload portion of the data packet on the BW channel 131 of the physical communications link 105, starting from the recorded memory location corresponding to the interruption.

As another example, the receiver 150 detects an error in the part of the payload portion transmitted before the interruption through the physical communications link 105. In this case, the message transmitted on the virtual channel 132 of the physical back communications link 105' on behalf of the receiver 150 requests (i) the interruption of the transmission of the payload portion of the data packet on the BW channel 131 of the physical communications link 105, and (ii) retransmission of a part of the payload portion transmitted before the interruption. Once it causes the interruption requested in the message, the transmitter circuitry 115 retransmits, on the BW channel 131 of the physical communications link 105, the part of the payload portion of the data packet transmitted before the interruption.

As described in detail above in this specification, the high speed serial link 105 (105') shown in FIG. 1 supports an LL virtual channel 130 (132) and a BW virtual channel 131 (133). In accordance with disclosed technologies, transmissions through the LL virtual channel 130 (132) have higher priority than transmissions through the BW virtual channel 131 (133). In addition, virtual channels of the chip-to-chip communications link 105 (105') described in this specification can be implemented at low area cost, e.g., by configuring a size of a replay buffer 145 (145') associated with the BW virtual channel 131 (133) to be less than a size of BW packets transmitted through the BW virtual channel 131 (133).

Prior to transmission through the virtual channels of the disclosed chip-to-chip communications link 105 (105'), data packets can be fragmented in fragments that are chained together. The fragments transmitted through the LL virtual channel 130 (132) are typically smaller than the fragments transmitted through the BW virtual channel 131 (133). The fragments associated with a packet are self-contained with respect to transmission through the disclosed chip-to-chip communication link 105 (105'), such that each of the fragments has its own link cyclic redundancy code (LCRC). In general, store-and-forward of small fragments provides low latency at the expense of throughput through a virtual channel. Moreover, fragmenting packets into large fragments that are chained together provides high throughput at the expense of longer store and larger forward latency. In accordance with the disclosed technologies, fragments transmitted through the LL virtual channel 130 (132) are smaller than fragments transmitted through the BW virtual channel 131 (133). For example, when buffers associated with the BW virtual channel 145, 185 (145', 185') have a size of 256 bytes, 4K packets can be transmitted through the BW virtual channel 131 (133) as multiple fragments that have a size of 256 bytes and are chained together.

Transmission latency that is even lower than the latency of the foregoing store-and-forward transmissions can be achieved by cut-through transmissions. A cut-through transmission is a technique used by packet transmitting systems 100, where a packet transmitter 110 (110') starts forwarding a packet before the whole packet has been received by the packet transmitter, for example as soon as the destination address of the received packet is processed. Compared to store-and-forward, the latter technique reduces latency through the transmission link 105 (105'), but can be less reliable, because corrupted packets are potentially transmitted. The fact that a transmitted packet contains errors can be determined only when the receiver 150 (150') performs LCRC after the entire packet was received. However, the CPU of the second (first) device 101-2 (101-1) may already be acting on bad data when the receiver 150 (150') determines, at this point, that a transmitted packet is bad. Such situation can be hard (and in some cases impossible) to unwind.

Chaining fragments of a packet prior to transmission avoids the foregoing problem. As such, the transmitter side of the chip-to-chip communications link 105 (105') cuts-through chained fragments of a packet. A transmitted fragment is stored at the receiver side of the communications link in a buffer associated with the receiver 185 (185'). The receiver 150 (150') determines whether the LCRC is good for the fragment stored in the receiver buffer 185 (185'). In this manner, only good packets are forwarded by the receiver to a transaction layer of the SoC, e.g., to the second (first) device 101-2 (101-1). If the receiver 150 (150') determines that the LCRC is bad for the fragment stored in the receiver buffer 185 (185'), the bad fragment is dropped from the receiver buffer 185 (185') and a request is sent for a replay (retransmission) of the dropped fragment. In this manner, critical word latency is very good, since fragment latency is only slightly higher than pure cut-through transmission.

In some instances, very large, system level packets (e.g., relating to permanent storage of a computer system) are being transmitted through a single communications link. Transmitting such large packets using a conventional communications protocol can undermine latency of other packets, because the latter have to wait for the completion of a large packet transmission. Also, transmitting such large packets using a conventional communications protocol can negatively affect random access memory (RAM) sizing, because replay and flow control buffers are sized according to a size of the maximum packet expected to be transmitted through the communications link. Further, transmitting such large packets using a conventional communications protocol can lengthen buffer lifetime, because a packet cannot be purged from a replay buffer until it has reached a transaction layer of a link partner (at the receiver side).

In the chip-to-chip communications described in this specification, a maximum payload size can be set to 64 DWORDS. Other maximum payload sizes can be 16, 32 or 128 DWORDS. A DWORD is a 32-bit unsigned integer (range: 0 through 4294967295 decimal). In accordance with the disclosed technologies, each of the transaction layer packets (TLPs) is considered to be a single AXI transaction. Additionally, a TLP is fragmented into fragment packets (or simply fragments) prior to transmission, such that each of the fragment packets carries an associated portion of a payload of the TLP. A start-of-packet (SOP) bit indicates that a new TLP is starting. A first fragment contains control information such as length of the TLP, address, cache and protection attributes. Subsequent fragments just indicate which virtual channel they are to be transmitted on and have the SOP bit=0. This value of the SOP bit indicates that such fragments are chained to corresponding previous fragments. Packet overhead for the chained fragments is small because the receiver can determine from the length specified in the first fragment packet how much more data to expect. By chaining the fragments in this manner, transmission of large packets can be supported by the disclosed chip-to-chip communications link 105 (105') without needing large buffers (at the transmitter side of the link 145/145' or at the receive side of the link 185/185') to store the fragment packets. Further in accordance with the disclosed technologies, LL packets are transmitted through an LL virtual channel 130 (132) by chaining small fragments of data (to insure low latency) and BW packets are transmitted through a BW virtual channel 131 (133) by chaining bigger fragments of data (to insure high throughput.)

As described above, in order to reduce the maximum payload size transmitted through the disclosed chip-to-chip communications link 105 (105'), chaining is used to transmit BW packets as fragments through the BW virtual channel 131 (133). Even in such cases, there may be situations when some LL packets to be transmitted through the LL virtual channel 130 (132) cannot wait for completion of a transmission through the BW virtual channel 131 (133) of an entire fragment of a BW packet. In order to be able to handle such situations, the chip-to-chip communications link 105 (105') described in this specification allows interruption of a transmission on the BW virtual channel 131 (133), such that a currently transmitted fragment of a TLP can be terminated early. In such case, a transmitter 110 (110') sends an END symbol. A state machine of the receiver 150 (150') tracks the length of the fragment of the TLP and will be ready to accept further chained fragments for this TLP.

Note that frequent interruption of transmission on the BW virtual channel 131 (133) can significantly diminish the throughput thereof, so a trade-off between throughput on the BW virtual channel 131 (133) and low latency on the LL virtual channel 130 (132) can be implemented for the disclosed chip-to-chip communications link 105 (105'). In some implementations, a programmable interruption granule "n", can be n=2, 4, 8, 16, 32 or 64 DWORDS. In this manner, when an interruption command is issued, a fraction of the currently transmitted fragment packet equal to the interruption granule is transmitted to the receiver 150 (150') before transmitting the END symbol to terminate the currently transmitted fragment.

In general, chip-to-chip communications can use a replay procedure to insure reliable link operation in the presence of occasional bit errors. Fragment packets are transmitted with an embedded CRC and a fragment sequence number. Data link layer ACK packets or NACK packets for a BW virtual channel 131 of the link 105 are returned through a LL virtual channel 132 on the opposite link direction 105'. An ACK packet is transmitted by (or on behalf of) the receiver 150 to the transmitter 110 to indicate that fragment packets up to a certain sequence number have been correctly received and can be purged from the transmitter's replay buffer 145. A NACK packet is transmitted by (or on behalf of) the receiver 150 to the transmitter 110 to indicate that a replay is needed and contains a sequence number of the last known good fragment packet.

The chip-to-chip communications link 105 (105') described in this specification can use a NACK-only replay mechanism, such that a NACK packet is transmitted by (or on behalf of) the receiver 150 to the transmitter 110 as soon as a corrupted fragment packet is detected to request retransmission of the fragment. Additionally, the transmitter 110 (110') keeps track of the time that fragment packets are stored in the replay buffer(s) 145 (145'), and can discard the stored fragment packets once they are stored therein for longer than a predetermined time. As the NACK response is transmitted by (or on behalf of) the receiver 150 to the transmitter 110 with low latency, the replay buffer 145 used by the transmitter 110 in accordance with the disclosed technologies can be smaller than the replay buffers that are used as part of conventional chip-to-chip communications.

Moreover, "just-in-time" flow control can be implemented as part of the disclosed technologies to enable the receiver 150 to prevent buffer 185 overflow by sending an instruction (via the LL virtual channel 132 of the back link 105') to the transmitter 110 to stop transmission of a fragment packet if a predetermined buffer threshold is reached. The fact that the instruction can be transmitted through a low latency back-channel 132 allows the receiver 150 to set the predetermined threshold close to the full capacity of the receiver buffer 185. In this manner, the chip-to-chip communications described in this specification uses less buffering and reduces the size of the receiver-side buffers 185 (185') relative to conventional chip-to-chip communications.

Additionally, the disclosed technologies can support active state power management (ASPM), such that power consumption of the communications link 105 (105') between the transmitter 110 (110') and the receiver 150 (150') changes automatically based on performance requirements. States of the transmitter 110 (110') and receiver 150 (150') with regard to power consumption can be directed through software instructions. A frequency of operation (data rate) can be variable, e.g., in the range of 1-8 Gbits/sec, albeit the data rate is fixed when the communications link is reset. The power consumption of the link scales approximately linearly with link speed, so the data rate can be tailored to power requirements of various applications/scenarios. For certain applications, the chip-to-chip communications link described in this specification 105 (105') can be configured to save up to 30% power relative to conventional communication links.

The combination of NACK protocol and "just-in-time" flow control described above in this specification allows for one direction of the communications link, e.g., 105, to be powered off when idle. In some implementations of the disclosed chip-to-chip communications link 105 (105'), the exit time is too high to power off the link when idle, because replay buffers 145 (145') and receiver buffers 185 (185') would need to increase in size in order to handle the increased exit time. For example, 1 μs exit time corresponds to a size of the replay buffer 145 (145') of (1 Kbytes*lanes) and a size of the receiver buffer 185 (185') of (1 Kbytes*lanes*VCs) at 8 Gbits/sec. These sizes would be correspondingly smaller at lower speeds. Accordingly, power management of the chip-to-chip communications link 105 (105') takes into account exit latency, as well as power consumed by each of LL and BW virtual channels 130 (132), 131 (133).

In some other implementations, maintaining sub 1 μs wake time allows for one direction of the communication link, e.g., 105, to be powered down when not used, except for Phase-Locked Loop (PLL) components. However, the PLL components may consume up to 40% of the active state power. Therefore, in some cases, the PLL components associated with the communications link 105 (105') also are turned off to decrease power consumption. In such cases, the exit latency (PLL lock time) of the chip-to-chip communications link 105 (105') may be impacted. In order to further reduce power consumption of the disclosed chip-to-chip communications link 105 (105'), the NAK and backpressure messages can be sent using dedicated back-channel sideband signal(s), for example. As another example, the NAK and backpressure messages can be sent using a conventional communication protocol over a low-speed, low power back-channel.

Additional power saving of the disclosed chip-to-chip communications link 105 (105') between first and second chips can be implemented in the physical layer thereof. In some implementations, a length of a trace that connects the first and second chips can be limited to reduce power consumption and relax jitter requirements. For example, the length of the trace is no longer than 10 cm. Moreover, as power scales linearly with swing voltage, the latter can be limited to reduce power consumption. For example, the swing voltage is no larger than 400 mV. The foregoing low swing voltage allows for providing a separate digital VDD (DVDD) of 0.9V instead of an analog VDD (AVDD) of 1.8V in order to further reduce the communications link power. In other implementations, separate clocks with few hundred part-per-million (PPM) difference are used to improve power consumption of the disclosed chip-to-chip communications link 105 (105'). In this case, spread-spectrum clocking (SSC) may not be supported and the wake-up time increases relative to implementations when a single clock is used. In some other implementations, to further increase power savings, the trace that connects the first and second chips is eliminated and the communications link 105 (105') between the first and second chips is implemented via DC coupling.

Examples of power states in accordance with the chip-to-chip communications described in this specification are shown below in Table 1.

TABLE 1

| State | Device State | Power Consumed | Exit time | Comments |
|---|---|---|---|---|
| P0 | D0 (ASPM), D0 (SW) | Full | n/a | Link fully active. Lowest latency. |
| P0s | D0 (ASPM) D0 (SW) | Low | ~200-500 ns, depends on ref clk scheme. | Link briefly inactive. Small power saving, fast exit latency. |
| P1 | D0 (ASPM) D1 (SW) | Lower | with PHY re-design (as described above) ~1us | Link inactive for longer time, bigger power saving, moderate exit latency. |
| P2 | n/a (ASPM) D2 (SW) | ~0 | >5 us | Everything powered off. Zero power, long exit time. |

Power state P0 corresponds to power consumption of a fully active link for the chip-to-chip communications described in this specification 105 (105'), and represents a fraction of the power consumption used in conventional chip-to-chip communications. Moreover, the exit time corresponding to the power state P1 of the disclosed chip-to-chip communications link 105 (105') is sub 1 μs. For this reason, lanes in each direction of the link 105 (105') can be independently powered down. In contrast, conventional chip-to-chip communications require that both directions be power-down together.

The disclosed technologies can be used to configure a high speed inter-chip communications link with virtual channels, such that the communications link supports low latency transmissions and differential QoS among the virtual channels. In general, chip area penalty for implementing virtual channels for a chip-to-chip communications link is reflected in the need to replicate replay buffers at a transmitter side of the link as receiver buffers on a receiver side of the link, for each of the virtual channels of the link. Area of transmitter and receiver chips, and hence a cost of these chips, is proportional to a size of their respective buffers. A buffer size for each of the virtual channels of the disclosed chip-to-chip communications link can be kept small, by means described below in this specification, allowing for multiple virtual channels to be implemented at a reasonable cost.

A way to decrease the size of the buffers, and hence the cost, of the transmitter and receiver circuitry is to minimize a buffer lifetime. The notion of buffer lifetime refers to a specified time a buffer of the transmitter or the receiver is occupied by a given element of data (e.g., by a packet, or a fragment of a packet) to be transmitted through a communication link between the transmitter and receiver. The buffer lifetime is short if the specified time is short. The given element of data stored in the buffer is discarded after the specified time and a new element of data (e.g., a new packet or subsequent fragment of the same packet) can be stored in the buffer. By minimizing buffer lifetime, such that data packets spend a minimal amount of time occupying the buffers on the transmitter and receiver chips, the size of these buffers is minimized and the area (and the cost) of the chips can be kept low.

The above-noted aspects of the disclosed chip-to-chip communications can be used to minimize buffer lifetime. For example, fragmentation of packets to be transmitted through the disclosed chip-to-chip communications link 105 (105') allows for a fragment of a packet sent by the transmitter 110 to be stored in a replay buffer 145 only until the receiver 150 acknowledges receipt of the fragment. In this manner, the replay buffer 145 can be freed in a shorter time compared to conventional chip-to-chip communications link. For the latter link, an entire packet should be stored in the replay buffer while the packet is being transmitted by a transmitter, e.g., a root complex (RC) device or an end point (EP) device. As another example, interruption of fragments transmitted through a BW virtual channel 131 (133) of the communications link in accordance with the disclosed technologies 105 (105') allows ACK/NACK packets to be returned sooner by the receiver 150 to the transmitter 110 compared to conventional chip-to-chip communications in which such ACK/NACK packets can be returned only after a complete packet transmitted by the transmitter is stored in a buffer of the receiver.

As yet another example, fragmentation allows for a fragment of a transmitted packet that is received by the receiver 150 (150') and stored in a buffer 185 (185') thereof to be forwarded by the receiver 150 to a transaction layer, e.g., to the second (first) device 101-2 (101-1), before the entire packet is received at the receiver 150 (150'). Such forwarding of the received fragment can occur because error checking info needed to check the integrity of the received fragment is part of the fragment stored in the receiver buffer 185 (185'), in accordance with the fragmentation. Moreover, the transaction layer can reassemble the packet using a tidemark feature (e.g., a chaining bit) of each of the received fragments of the packet, so the receiver 150 (150') can forward each of the received fragments to the transaction layer, e.g., to the second (first) device 101-2 (101-1), before the entire packet is received. As a further example, small packets to be transmitted on the LL virtual channel 130 (132) can be sent ahead of larger packets to be or being transmitted on the BW virtual channel 131 (133), in accordance with the disclosed technologies. In this manner, buffers 135 (135'), 175 (175') configured to store the foregoing small packets can be quickly freed.

Figure 3B:
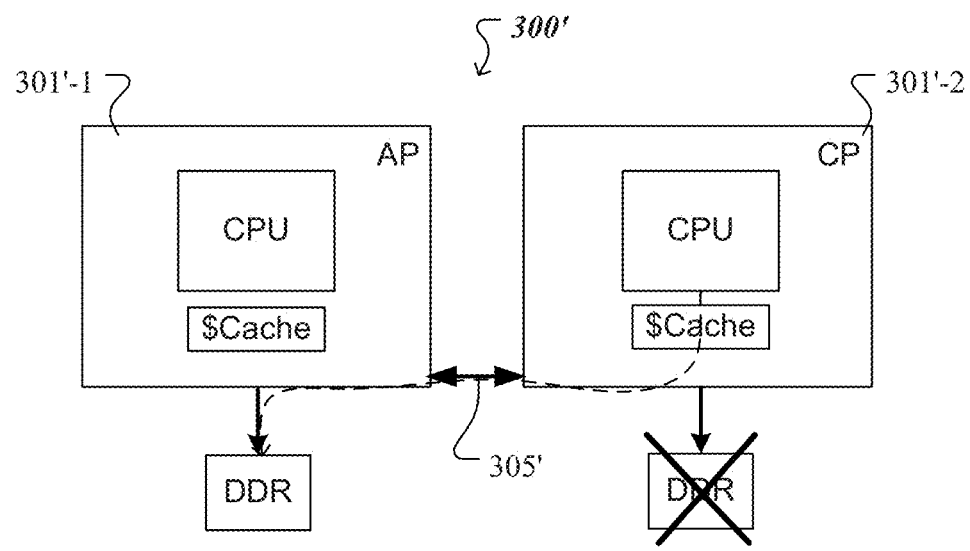

In addition, communications carried out in accordance with the disclosed technologies between two devices, e.g., 101-1, 101-2, respectively located on two different chips can be configured as if the two devices were located on a single chip. FIG. 3B shows an example of such a multi-chip integration 300' using the chip-to-chip communication link 305'. This link can correspond to the chip-to-chip communications link 305 described above in connection with FIG. 3A. In this instance, one of the two chips, e.g., CP 301'-2 transmits a packet through the chip-to-chip communications link 305' to the other one of the two chips, e.g., AP 301'-1, such that an overhead portion of the transmitted packet references an address location associated with the other one of the two chips. Multi-chip integration like the one described in connection with FIG. 3B can be implemented based on the following aspects.

In one aspect, the chip-to-chip communications link 105 (105') described in this specification uses bidirectional base address registers (BARs). By using symmetrical BARs in both link directions, each of the two chips can map a memory buffer of a slave device located on the other one of the two chips. In contrast, conventional chip-to-chip communications use BARs to map endpoint (EP) devices into root complex (RC) memory space.

In another aspect, the chip-to-chip communications link 105 (105') described in this specification uses symmetrical interrupts, such that each side of the link can send a quantity of interrupts to the other side. The interrupts are sent from one side of the link to the other one as write transactions. In this manner, with the exception of some additional low latency (corresponding to transmissions of LL packets through the LL virtual channel 130/132), sending interrupts through the LL virtual channel 130 (132) of the disclosed chip-to-chip communications link 105 (105') appears as if the interrupts were sourced by a slave on the same chip as a master that processes the received interrupts.

The proposed technologies are now described in more detail. As noted above in this specification in connection with FIG. 1, the proposed chip-to-chip communications link uses virtual channels in order to provide differential QoS corresponding to data transfers through the link. Traffic classes (TCs) supported by the disclosed technology are a low latency TC and a bandwidth TC. There can be up to 4 virtual channels, for instance. One of the virtual channels is a low-latency (LL) virtual channel, and the remaining ones are BW virtual channels. The disclosed chip-to-chip communications link is configured to avoid blocking low latency traffic on the LL virtual channel by other traffic streams on the BW virtual channels.

Virtual channels of conventional chip-to-chip communications links are configured with large buffers, and hence are typically expensive to implement. In contrast, the disclosed technologies use small size buffers, and hence are less expensive to implement compared to the conventional chip-to-chip communications links. The use of small size buffers is made possible, among other things, by implementing "just in time control". In this manner, a receiver can send a backpressure request very quickly, through a back-channel, and upon receipt of the request, a transmitter can promptly interrupt current transmission of a BW packet. Further, the use of small size buffers for the chip-to-chip communications described in this specification is made possible by maintaining short buffer lifetime. The latter can be accomplished by implementing fast propagation of NACK signals from the receiver to the transmitter. As such, the replay buffers on the transmitter side of the link can be configured to have a lifetime just long enough to cover NACK delay, for instance. Furthermore, the disclosed technologies use small size buffers by allowing a large transaction layer packet to be fragmented and by efficiently sending small packets. In this manner, a receiver side of the link quickly verifies whether fragments saved in receiver buffers are error-free, and if so, the verified fragments are immediately forwarded to the transaction layer. Such a quick verification also reduces receiver buffer lifetime. In contrast, conventional chip-to-chip communications used to transmit large, un-fragmented packets through a communications link required to maintain link throughput must often use buffers having large size and long buffer lifetime to accommodate worst case packet lengths, e.g., 4K. Moreover, flow control of such conventional chip-to-chip communications link can have low latency because an update message can be stuck behind such a 4K packet.

In contrast, the chip-to-chip communications link uses virtual channels to allow fully independent, non-blocking flow control through the communications link. This is accomplished by configuring each virtual channel from among the virtual channels with a dedicated AXI interface to ensure that the virtual channel is fully non-blocking. In contrast, conventional out-of-order communications schemes, e.g., schemes using AXI tags, can experience head-of-line (HOL) blocking. Additionally, the virtual channels implemented as part of the disclosed technologies support differential QoS, such that critical data is transmitted from a transmitter chip to a receiver chip through a LL virtual channel, as part of LL traffic, and bulk/bandwidth data is transmitted from the transmitter chip to the receiver chip through a BW virtual channel, as part of BW traffic.

Figure 4:
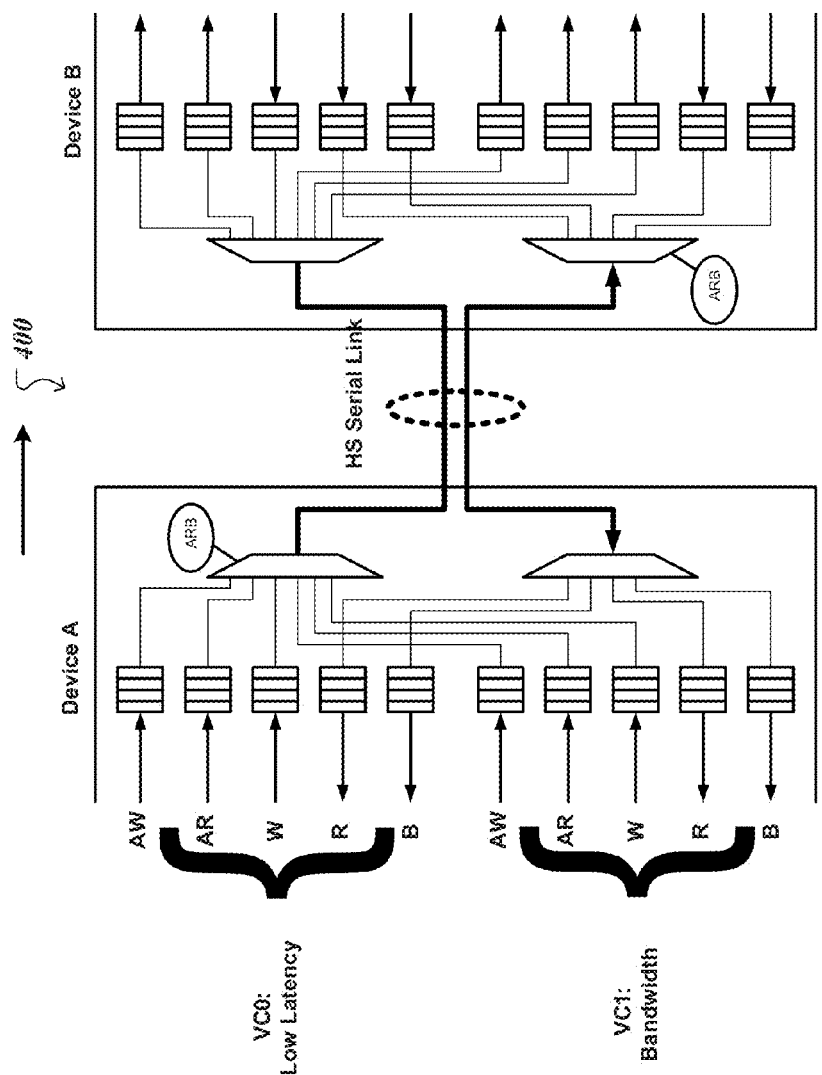
FIG. 4 shows aspects of an example of a serial communications link including a low latency virtual channel and a bandwidth virtual channel.

FIG. 4 shows a schematic diagram of a high speed serial link 400 between first and second chips (devices A and B, respectively). In accordance with the chip-to-chip communications link described in this specification, each of the virtual channels corresponding to one of the chips sees a same view of an address map of the other one of the chips through corresponding BARs.

In addition, virtual channel arbitration associated with the disclosed technologies obeys AXI QoS. For example, timer arbitration is used to prevent starvation. Note that the original QoS value is passed when the timer is used to prevent starvation. Moreover, a timeout causes QoS to be treated as if the value of QoS is maximum, e.g., max QoS value=15 from among QoS values in set {0, 1, . . . , 15}. As another example, a least-recently-granted arbitration is used to select between requests of equal QoS value. In accordance with the disclosed technologies, traffic corresponding to the LL virtual channel can have a highest QoS value (to indicate highest priority). In some cases, if LL messages issued by a master device exceed allocated bandwidth, a fabric QoS module of the communications link may drop the QoS value of the messages. In this case, bulk transfers on the BW virtual channel may get arbitration priority.

Figure 5:
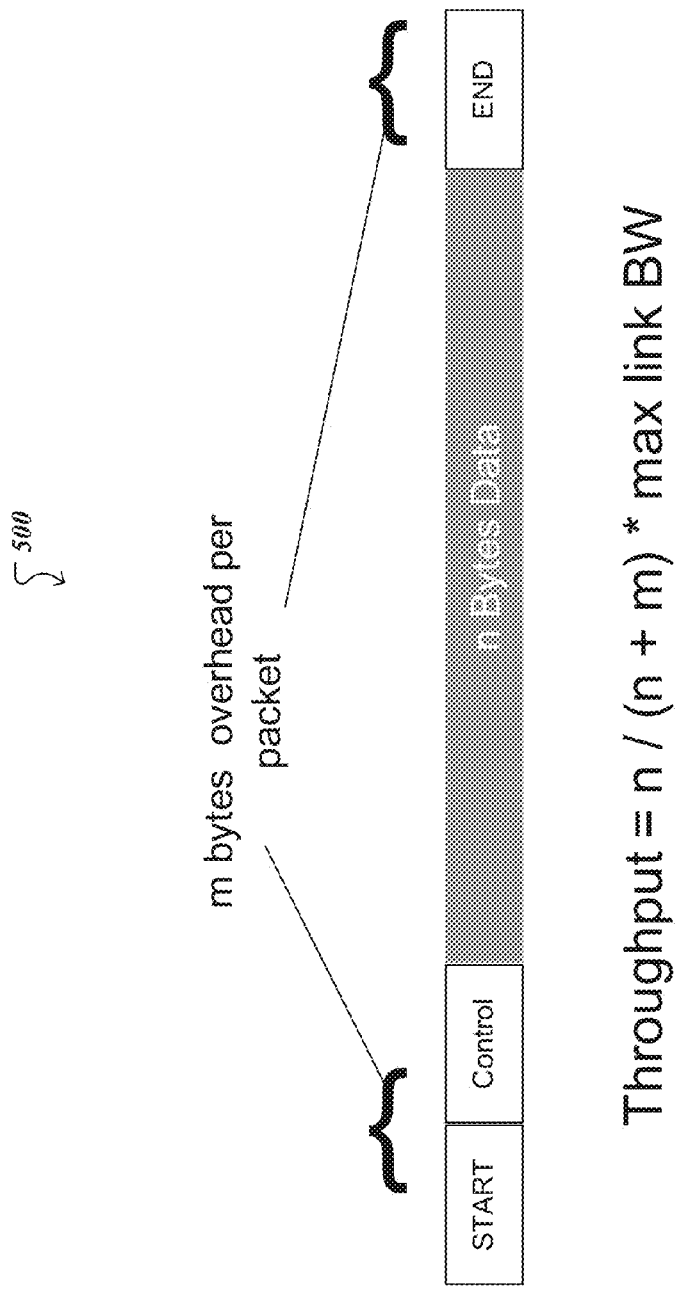
FIG. 5 shows an example of format of a data packet transmitted through a serial communications link.

FIG. 5 shows an example of a format of a packet 500 sent through a virtual channel of a communications link. The packet includes m bytes overhead and n bytes payload. The throughput through the communications link is calculated as n/(n+m)*max(link BW). Throughput of a virtual channel of the communications link can be maximized by maximizing n or minimizing m, or both. Typically, it is desirable to send a large payload (large n) through the virtual channel. However, when n is large, latency of the virtual channel also is large due to store-and-forward delays. Further, minimizing packet overhead, m, is especially important for small packets.

Figure 6B:
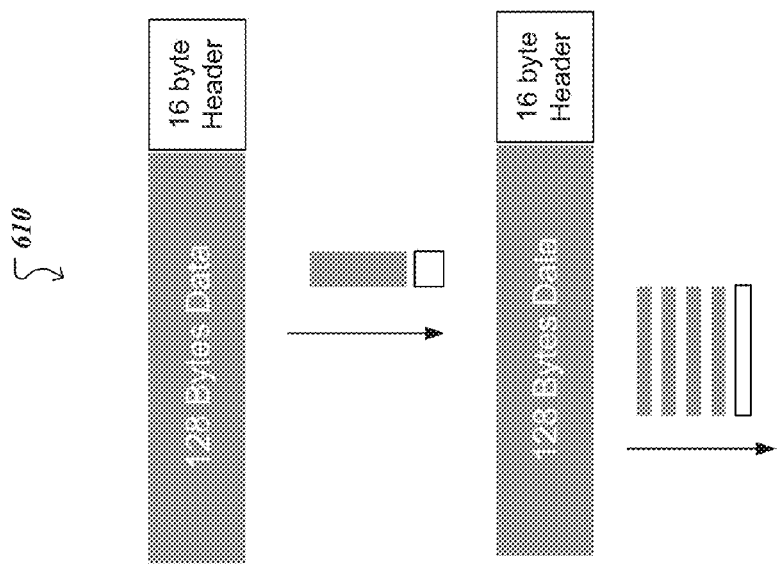
FIGS. 6A-6B show aspects of packet transmissions through a serial communications link.
Figure 6A:
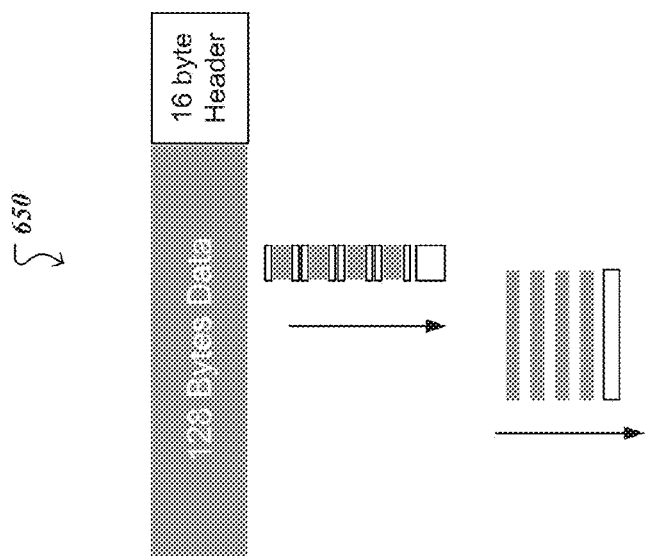

FIG. 6A shows transmission 610 of a packet through a communications channel between transmitter and receiver chips, in accordance with conventional chip-to-chip communications. The packet includes a 16 byte header and 128 byte payload. First, the entire packet should be stored in a replay buffer of the transmitter chip. The foregoing buffering takes approximately 20 ns. Second, the packet is transmitted serially through the channel. Transmission of the entire packet at a rate of 8 Gbits/sec takes 144 ns. Third, the receiver chip stores in a receiver buffer the entire transmitted packet before checking CRC. Once it is determined that a result of the CRC check is positive, the stored packet is forwarded by the receiver to the transaction layer.

FIG. 6B shows transmission 650 of a packet through a virtual channel between transmitter and receiver chips, in accordance with chip-to-chip communications described in this specification. Once again, the packet includes a 16 byte header and 128 byte payload. In this case, only a fragment of the entire packet that is large enough to begin packet transmission is initially stored in a replay buffer of the transmitter chip. Buffering of the fragment takes approximately 5 ns. In this manner, each additional fragment of the packet is transmitted serially through the virtual channel. Each additional fragment has a 4 byte header to chain the current fragment to the previously transmitted fragment in the series of additional fragments. As such, the serial transmission of the packet at a rate of 8 Gbits/sec takes 16 ns for the header and 36 ns for each fragment of the series of fragments. Further, the receiver chip stores in a receiver buffer only the transmitted fragment before checking CRC therein. Once the CRC check is successfully performed, the stored fragment is forwarded to the transaction layer. In this manner, a combination of fragmentation of the packet and chaining of the fragments in accordance with the disclosed technologies reduces latency associated with transmission of the packet from 164 ns to 57 ns for control+first data delivered to the transaction layer.

Additionally, the disclosed technologies allow insertion of an IDLE symbol in a packet to fragment the packet to be transmitted through a virtual channel. Fragmentation of a packet by IDLE symbol insertion reduces the transmitter store-and-forward latency since the transmitter chip need not wait for the entire packet to be available for transmission before beginning to transmit a fragment of the packet that is currently available. Moreover, the transmitter can be configured to gather up at least n DWORDS before inserting the IDLE symbol to form the current fragment of the packet. Further, fragmentation of a packet by IDLE symbol insertion reduces latency of an elastic buffer of the receiver chip. For instance, if the elastic buffer underflows, it can send an IDLE symbol to the transaction layer. The IDLE symbol to be sent by the elastic buffer to the transaction layer can be created by the elastic buffer and need not be received through the link from the transmitter.

In some implementations, when backpressure occurs, IDLE symbol insertion can stop packet transmission right away. In other implementations, when backpressure occurs, transmission of a BW packet is stopped by early termination, while transmission of an LL fragment is allowed to complete.

Packet priority can be indicative of worst case latency that is allowed for a transmission of a packet through a chip-to-chip communications link. Table 2 shows multiple packet types sorted in decreasing order of priority, in accordance with the disclosed technologies.

TABLE 2

| Packet Type | Comment |
| --- | --- |
| Halt (backpressure) | A Halt packet can be sent through any of the virtual channels. Can interrupt non-LL virtual channels. |
| NACK | A NACK packet can interrupt non-LL virtual channels. |
| SKIP | A SKIP packet does not interrupt, but wins arbitration when current fragment of TLP is finished. SKIP packets are not used if common ref clock is used over the chip-to-chip communications link. |
| TLP | TLPs obey AXI QoS. Each virtual channel has starvation timer. A fragment of a TLP is promoted to highest priority at time expiration, QoS value within the TLP is not modified though. |
| Interrupt TLP | Interrupt packet has same priority as TLP, and is sent with a fixed (programmable) AXI QoS value. Interrupt packets are always sent on LL virtual channel. |

In order to control the flow of data between two chips in accordance with the disclosed technologies, a receiver buffer controller monitors an amount of data stored in the receiver buffer. When the receiver buffer is occupied beyond a predetermined threshold, the receiver buffer controller sends a throttle message (also referred to as a flow control message) to instruct the transmitter to hold-off sending more than n additional symbols. Such flow control messages can be sent periodically to the transmitter while the receiver buffer is still occupied up the predetermined threshold. The chip-to-chip communications described in this specification allows the receiver buffer controller to send flow control messages quickly by interrupting current data transfer on the back BW virtual channel(s). In response to receiving a flow control message from the receiver controller, a transmitter controller quickly stops sending a current fragment on a BW virtual channel, as described above in this specification. Moreover, the transmitter controller is configured to wait a predetermined time interval for another flow control message to arrive on the back LL virtual channel from the receiver. The transmitter controller is configured to resume current transmission of the fragment through the BW virtual channel, if another flow control message fails to arrive during the predetermined time interval.

In accordance with the chip-to-chip communications described in this specification, flow control messages are sent with highest priority using, e.g., throttle fibre channel (FC) packets. In this manner, flow control latency includes 100 ns of margin latency+the time needed to send a throttle packet. As the throttle packet typically includes 10 bytes, a transmission time thereof is 10 ns, such that the flow control latency is a total of 110 ns. In this manner, the predetermined threshold of the receiver buffer(s) can be specified in terms of the flow control latency, the number of lanes and the transfer rate per lane. For a communications link that supports transmitting 1 byte every 1 ns per lane and a 110 ns flow control latency, there need to be at least (110*number of lanes per virtual channel) bytes left free in the receiver buffer when a throttle packet is sent.

In order to ensure that the disclosed chip-to-chip communications link is reliable, CRC is checked for each fragment in a series of fragments of a packet when the fragment is received by the receiver. When a transmission error is detected by the CRC check, a NACK message is sent to the transmitter to request that the received fragment be replayed. The transmitter is configured to save the transmitted fragment in a replay buffer, and to replay it when a NACK message is received. The NACK message need not include a sequence number associated with the transmitted segment because the transmitter is configured to re-send everything in the replay buffer. In case a NACK packet is corrupted, an implicit NACK can be used on both links. For example, when the CRC check detects an error, the receiver is configured to start replaying everything in the receiver side replay buffer. In this manner, the link partner receives a NACK message or replayed fragments.

Moreover, in order not to delay LL packets on the back LL virtual channel, an ACK message is not sent to the transmitter when no transmission error is detected by the CRC check. Additionally, the transmitter is configured to age the transmitted fragment over time, and then discard the aged fragment. The age at which a transmitted fragment is purged from the replay buffer can be specified based on the latency for sending a NACK packet. As the latency for sending the NACK packet is small for the disclosed technologies, the replay buffer of the transmitter is relatively small. In contrast, conventional chip-to-chip communications require relatively large replay buffers to accommodate long ACK/NACK latency.

As noted above, the disclosed technologies are based on a CRC check and replay to provide a reliable chip-to-chip communications link. The chip-to-chip communications link described in this specification is configured with a CRC that can detect transmission errors as low as triple bit flip. As for most digital codes, error detection and correction abilities of polynomial codes are determined by the minimum Hamming distance (HD) of the code. For example, if a CRC polynomial has HD=3 for a given link, that means there are no possible combinations of 1, nor 2-bit errors (where a bit error is an inversion of a bit value) that can result in an undetected error, but there is at least one combination of 3 bits that, when corrupted as a set within a packet, is undetectable by that CRC.

Table 3 shows maximum length at HD polynomial at a given CRC size and data word length.

TABLE 3

| Max length at HD Polynomial | CRC Size (bits) | | | | | | | | | | | | | |
|---|---|---|---|---|---|---|---|---|---|---|---|---|---|---|
| | 3 | 4 | 5 | 6 | 7 | 8 | 9 | 10 | 11 | 12 | 13 | 14 | 15 | 16 |
| HD = 2 | 2048+ 0x5 | 2048+ 0x9 | 2048+ 0x12 | 2048+ 0x21 | 2048+ 0x48 | 2048+ 0xA5 | 2048+ 0x167 | 2048+ 0x327 | 2048+ 0x64D | — | — | — | — | — |
| HD = 3 | | 11 0x9 | 26 0x12 | 57 0x21 | 120 0x48 | 247 0xA6 | 502 0x167 | 1013 0x327 | 2036 0x54D | 2048 0xB75 | — | — | — | — |
| HD = 4 | | | 10 0x15 | 25 0x2C | 56 0x58 | 119 0x97 | 246 0x14B | 501 0x319 | 1012 0x583 | 2035 0xC07 | 2048 0x102A | 2048 0x21E8 | 2048 0x4976 | 2048 0xBAAD |
| HD = 5 | | | | | | 9 0x9C | 13 0x185 | 21 0x2B9 | 25 0x507 | 53 0x8F8 | none | 113 0x212D | 136 0x6A8D | 241 0xAC9A |
| HD = 6 | | | | | | | 8 0x13C | 12 0x28E | 22 0x532 | 27 0xB41 | 52 0x1909 | 57 0x372B | 114 0x573A | 135 0xC86C |
| HD = 7 | | | | | | | | | 12 0x571 | 12 none | 12 0x12A5 | 13 0x28A9 | 16 0x58D5 | 19 0x968B |
| HD = 8 | | | | | | | | | | 11 0xA4F | 11 0x10B7 | 11 0x2371 | 12 0x6308 | 15 0x8FDB |

Based on the information shown in Table 3, transmission of a 15 byte packet can use an 8 bit CRC to be reliable to triple bit flip. Further, transmission of a 256 byte packet can use a 13 bit CRC to be reliable to triple bit flip. Furthermore, transmission of 512 byte packet (which corresponds to a packet carrying 4096 bits of data) can use a 16 bit CRC to be reliable to triple bit flip.

The disclosed technologies are configured to have low packet overhead in order to achieve a link throughput larger than 90% for BW packet transmissions. Accordingly, no more than 16 bytes of overhead are used for every 256 bytes of data. Therefore, BW packets transmitted through the disclosed chip-to-chip communications link are fragmented and chained prior to transmission, and such, a small overhead can be used for transmission of each of the chained fragments. In some implementations, the maximum overhead per chained fragment is kept below 14 bytes. As described above, 16 bits of the fragment overhead is used is used for the CRC.

In some cases, 128b/130b schemes are required for encoding packets transmitted over a chip-to-chip communications link. In such cases, packets transmitted in accordance with the disclosed technologies are provided with in-frame CRC. For example, an LCRC portion of the CRC can be allocated 1 byte, so the freed-up byte can be used for the frame CRC. In some applications, elliptic code cryptography (ECC) may need to be implemented on frame length, because receipt of incorrect frame length would cause the disclosed technologies to re-do block sync.

In order to further improve utilization of the chip-to-chip communications link described in this specification, packets can be aligned over the multiple virtual channels of the link prior to transmission. In some implementations, alignment can be performed such that packets start on a DWORD boundary on all the multiple virtual channels. DWORD alignment can simplify multi virtual channel transmissions because configurations based on DWORD alignment can be multiplexed without having to verify packet alignment prior to transmission. In other implementations, alignment can be performed such that packets start on a given byte on all the multiple lanes. Byte alignment can improve link utilization because the transaction packets do not need to be padded to the alignment boundary. For instance, byte alignment is used when chained fragments have a 6 byte overhead, in order to avoid having to extend the overhead to 8 bytes, as necessary if DWORD alignment were used.

The chip-to-chip communications described in this specification can operate in conjunction with a physical layer (PHY) of either Peripheral Component Interconnect Express (PCIe) or mobile industry processor interface (MIPI). For example, PCIe PHY provides highest throughput. As another example, MIPI M-PHY provides best power optimization and operates up to 5.9 Gbits/sec. In accordance with the disclosed technologies, PHY uses a 400 mV swing (in contrast to 800/1200 mV used in PCIe) and is optimized for shorter traces than PCIe.

Active state power management (ASPM) of the chip-to-chip communications described in this specification can be implemented as in PCIe. For layer zero L0 communications, power can be temporarily removed from an idle direction of the communications link. However, turning off one direction of the communications link increases the latency thereof. As such, the power savings mode can be programmatically turned on or off, depending on the latency vs. power savings trade-offs for a particular use of the communications link. For layer one L1 communications, both directions can negotiate to power down when the communications link is idle. In this case, the idle link is retrained before operation through the link can be restored.

The chip-to-chip communications link described in this specification also support PCIe L1 substrates. In this manner, a transmitter controller can request to turn off a reference clock. Such requests can be enabled programmatically. Additionally, the transmitter controller can programmatically turn the communications link on or off. Moreover, the disclosed technologies can be used to implement an asymmetric chip-to-chip communications link. This feature is useful when data traffic is asymmetric, for example. Note, however, that training and loopback testing tends to be more complicated for asymmetric links than for symmetric links.

In addition to the aspects described above, the disclosed technologies allows for AXI protocol mapping. Table 4 shows how the AXI protocol maps write address channels.

TABLE 4

| Signal | Width | Comment |
| --- | --- | --- |
| AWID | 0-16 | Use 0; Each virtual channel (VC) is in-order, so no ID is needed |
| AWADDR | 32-64 | Addresses of 40 bits can be supported. |
| AWLEN | 4-8 | Use 8 bit length. May need larger field on link to express length in DWORDS. Encoding length in AxSIZE units complicates data validation. |
| AWSIZE | ? | Not needed; use 10 bit length to encode length in DWORDs. |
| AWBURST | 2 | Support FIXED; Or just 1 bit for INCR vs. WRAP. Only allow WRAP on LL channel. |
| AWLOCK | 1 | Supported; AXI4 version, exclusive but no lock. |
| AWCACHE | 4 | Supported. |
| AWPROT | 4 | Supported. |
| AWREGION | N | Not supported - carries redundant address space information. |
| AWQoS | 4 | Supported; can be encoded in fewer bits. Half byte per transaction may too much for some applications. |
| AWUSER | 1-32 | Carry USER bits; Can be made optional; USER can carry up to 8 bits. |
| AWVALID | 1 | Not needed on link |
| AWREADY | 1 | Not needed on link |

Table 5 shows how the AXI protocol maps read address channels.

TABLE 5

| Signal | Width | Comment |
| --- | --- | --- |
| ARID | 0-16 | Use 0; Each VC is in-order, so no ID is needed |

TABLE 5-continued

| Signal | Width | Comment |
|---|---|---|
| ARADDR | 32-64 | Addresses of 40 bits can be supported. |
| ARLEN | 4-8 | Use 8 bit length. May need larger field on link to express length in DWORDS. Encoding length in AxSIZE units complicates data validation. |
| ARBURST | 2 | Support FIXED; Or just 1 bit for INCR vs. WRAP. Only allow WRAP on LL channel. |
| ARLOCK | 1 | Supported; AXI4 version, exclusive but no lock. |
| ARCACHE | 4 | Supported. |
| ARPROT | 4 | Supported. |
| ARREGION | N | Not supported - carries redundant address space information. |
| ARQoS | 4 | Supported; can be encoded in fewer bits. Half byte per transaction may too much for some applications. |
| ARUSER | 1-32 | Carry USER bits; Can be made optional; USER can carry up to 8 bits. |
| ARVALID | 1 | Not needed on link |
| ARREADY | 1 | Not needed on link |

Table 6 shows how the AXI protocol maps write data channels.

TABLE 6

| Signal | Width | Comment |
|---|---|---|
| WID | 0-16 | Use 0; Each VC is in-order, so no ID is needed |
| WDATA | 32-256 | Carries n bytes per packet. |
| WSTRB | 4-32 | 1 bit per byte. |
| WLAST | 1 | Not needed. |
| WUSER | 1-32 | Carry USER bits; Can be made optional. |
| WVALID | 1 | Not needed on link |
| WREADY | 1 | Not needed on link |

Table 7 shows how the AXI protocol maps write response channels.

| Signal | Width | Comment |
|---|---|---|
| BID | 0-16 | Use 0; Each VC in-order, so no ID is needed |
| BRESP | 2 | Needed. |
| WUSER | 1-32 | Carry USER bits; Can be made optional. |
| WVALID | 1 | Not needed on link |
| WREADY | 1 | Not needed on link |

Table 8 shows how the AXI protocol maps read data channels.

| Signal | Width | Comment |
|---|---|---|
| RID | 0-16 | Use 0; Each VC in-order, so no ID is needed |
| RDATA | 32-256 | Carries n bytes per packet. |
| RRESP | 2 | Needed |
| RLAST | 1 | Not needed. |
| RUSER | 1-32 | Carry USER bits; Can be made optional. |
| RVALID | 1 | Not needed on link |
| RREADY | 1 | Not needed on link |

The case shown in Table 8 corresponds to RRESP per beat. Per fragment check, one response per fragment can be sent. If forward err, RRESP is set to SLVERR.

The chip-to-chip communications link described in this specification can be configured to support unaligned data transfers using full strobes. For example, the transmitter transmits 1 byte strobe after every 8 bytes of data. In this case, the use of strobes adds ⅛ overhead to transmissions over the communications link. Alternatively, a transmission over the communications link in accordance with the disclosed technologies can be configured to handle arbitrary start and end bytes. In such cases, a last fragment of a packet sent over a BW virtual channel includes information to indicate how many bytes are populated. In this situation, the transmitter will still transmit the correct number of DWORDS up the length*size boundary. Furthermore, the disclosed technologies can be configured to use AXI length*size and to take into account starting addresses. The starting addresses can be indicated via a USER signal. An integrator component of the communication system described in this specification ties-off the USER signal at a Master device to match the needs thereof.

Figure 7:
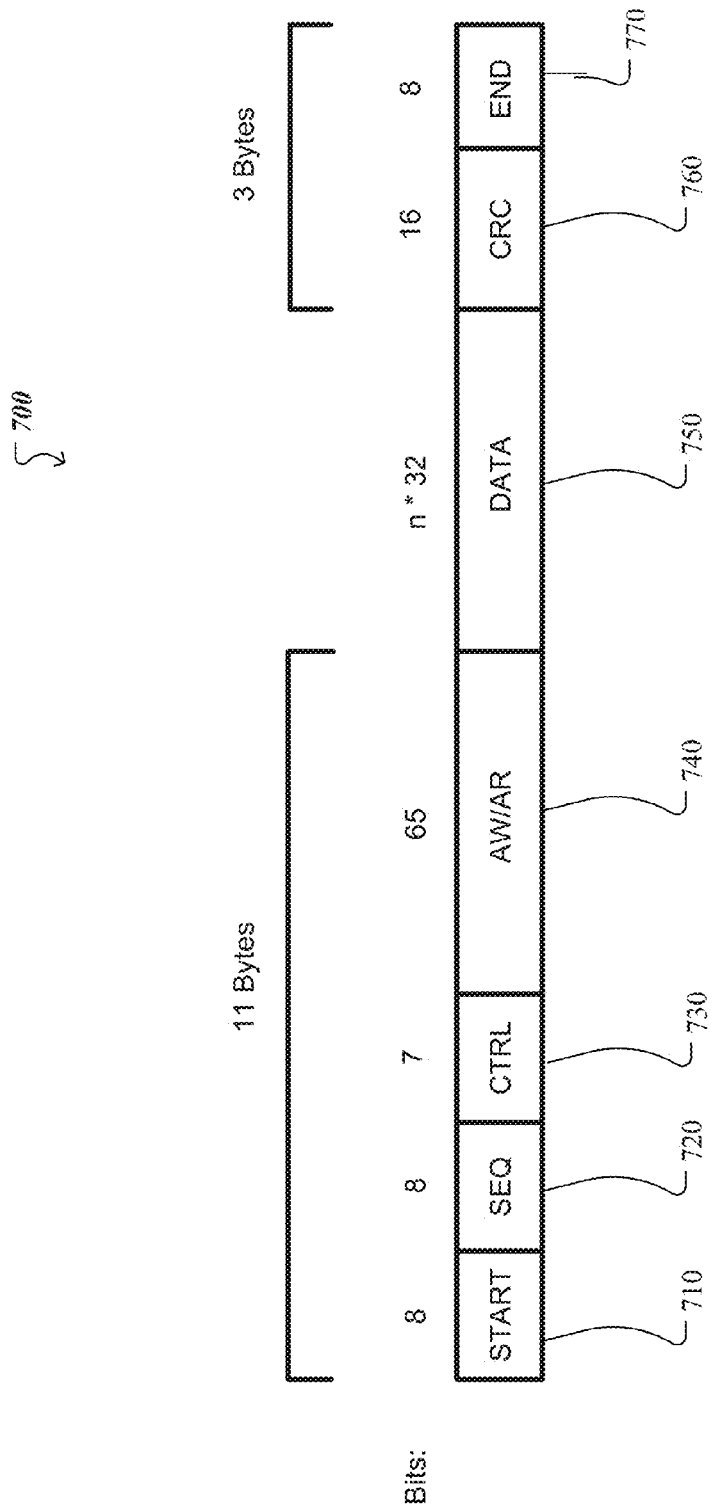
FIG. 7 shows an example of a packet format used for read/write requests.

FIG. 7 shows an example of packet format 700 in accordance with the disclosed technologies used for AXI read/write requests. The packet includes (i) overhead and (ii) a payload 750. The overhead has 14 bytes and is transmitted in two portions: a first portion of the overhead, which has 11 bytes and includes four fields 710, 720, 730 and 740, is transmitted by the receiver as part of the packet before sending the payload 750 of the packet. A second portion of the overhead, which has 3 bytes and includes two fields 760 and 770, is transmitted by the receiver as part of the packet after sending the payload 750 of the packet.

A first field 710 of the first portion of the overhead corresponds to a start K code (START) and has 8 bits. A second field 720 of the first portion of the overhead corresponds to a sequence number (SEQ) and has 8 bits. There can be up to 128 outstanding packets in a replay buffer at the transmitter side of the communications link. A third field 730 of the first portion of the overhead corresponds to a start of packet (SOP) and has 7 bits. The third field 730 can indicate whether the current packet is a control (CTRL) or data packet, whether a read or write packet, whether request or response packet. Two of the 7 bits of the third field 730 are used to specify the virtual channel (VC) used for transmission of the packet. One of the 7 bits of the third field 730 is used as a forward error (FE) bit. A fourth field 740 of the first portion of the overhead can indicate a write/read address (AW/AR) and has 65 bits. Forty of the 65 bits of the fourth field 740 specify an address of protection cache. Ten of the 65 bits of the fourth field 740 specify a length of the packet (in DWORDS). One of the 65 bits of the fourth field 740 specifies whether the address is locked. Two of the 65 bits of the fourth field 740 specify a burst type of the transmission over the communications link. The remaining twelve of the 65 bits of the fourth field 740 specify an AXI QoS value of the packet transmission.

The payload 750 of the packet includes data to be transmitted over the communications link as part of the packet and has n*32 bits. None of the payload data is used for the AXI read. Moreover, the first field 760 of the second portion of the overhead includes 16 bit CRC. The second field 770 of the second portion of the overhead corresponds to end K code (END) and has 8 bits. In this manner, a ratio of the payload size to the transmitted packet size is n*32/(n*32+14 bytes). This ratio can be increased by reducing the size of the packet overhead. The overhead size per transmission can be reduced, for example, by fragmenting and chaining the packet before transmission, as described below.

Figure 8:
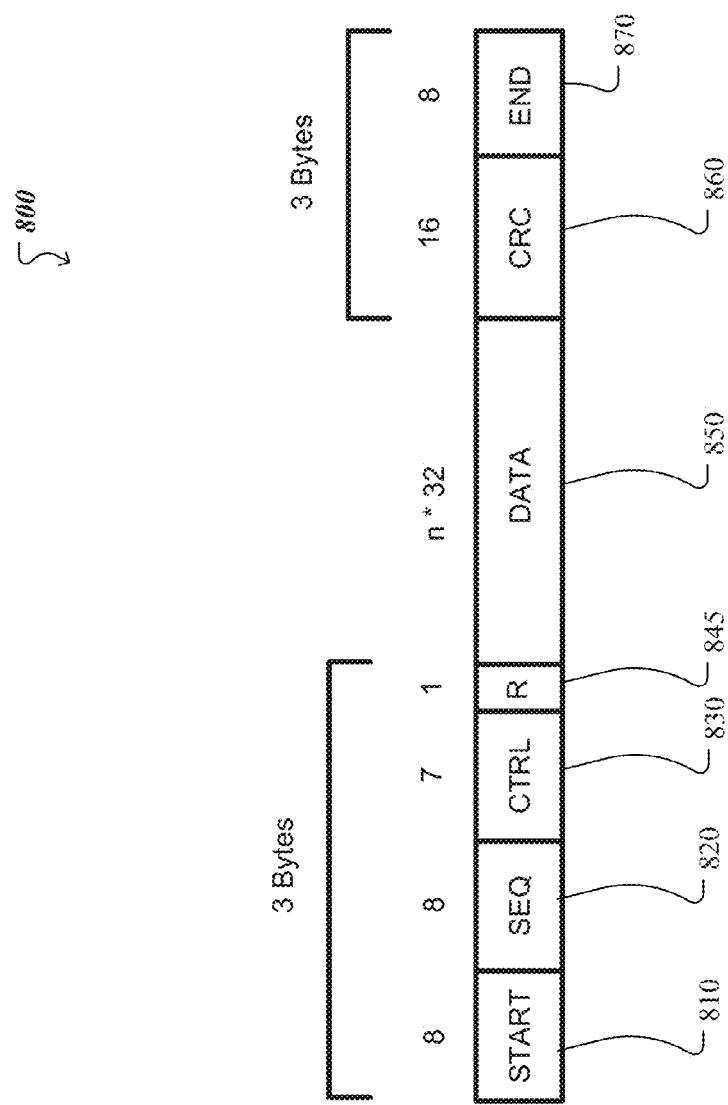
FIG. 8 shows an example of a packet format used for read/write responses or for a chained read/write continuation fragment of a currently transmitted packet.

FIG. 8 shows an example of packet format 800 in accordance with the disclosed technologies used for read response or write response, or for a chained read/write continuation fragment of a currently transmitted packet. The packet/fragment includes (i) overhead and (ii) a payload 850. The overhead has 6 bytes and is transmitted in two portions: a first portion of the overhead, which has 3 bytes and includes four fields 810, 820, 830 and 845, is transmitted by the receiver as part of the packet/fragment before sending the payload 850 of the packet/fragment. A second portion of the overhead, which has 3 bytes and includes two fields 860 and 870, is transmitted by the receiver as part of the packet/fragment after sending the payload 850 of the packet/fragment. The first three fields 810, 820 and 830 of the first portion of the overhead correspond to the three fields 710, 720 and 730 described above in connection with FIG. 7. Similarly, the two fields 860 and 870 of the second portion of the overhead correspond to the fields 760 and 770 described above in connection with FIG. 7.

A fourth field 845 of the first portion of the overhead corresponds to a chaining indicator (R) and has 1 bit. The chaining indicator R specifies that the current fragment is chained to and follows a previous fragment of the packet being transmitted through the communications link. In this manner, the ratio of the payload size to the transmitted fragment size is n*32/(n*32+6 bytes). This value of the foregoing ratio for a continuation fragment can be 20% higher than the value of this ratio for the packet described above in connection with FIG. 7.

Typically, only a small portion of traffic through a communications link requires low latency, while high throughput is required for the remaining portion of the traffic. The packets described in connection with FIGS. 7-8 can be used in accordance with the disclosed technologies to provide the high throughput portion of the traffic through the BW virtual channels of the communications link. The portion of the traffic which requires low latency is provided on a LL virtual channel of the communications link.

In some implementations, a chip-to-chip communications link implemented in accordance with the disclosed technologies has its own base address registers (BARs.) In addition, the BARs are implemented in a bi-directional manner, such that there is no asymmetry between host/device (master/slave). A BAR0 is implemented to point to a local register block of the chip-to-chip communications link. The number of BARs is configurable from 2-32, such that at least one BAR is used for register programming, and another BAR is used for memory access. The foregoing BARs of the chip-to-chip communications link are configured to support 64 bit addressing. Currently, 40 bit addresses are used over most chip-to-chip communications. Moreover, the BARs associated with the chip-to-chip communications link implemented in accordance with the disclosed technologies are independent of virtual channel, such that each of the virtual channels of the chip-to-chip communications link sees same view of inter-chip address map.

The forgoing BAR configuration of the chip-to-chip communications link implemented in accordance with the disclosed technologies enables that AXI ordering rules are followed end to end (e.g., for master and slave communications.) Hence, a software process (SW) executed by a pair of master/slave devices, with the master device located on a first of two chips and the slave device located on a second of the two chips, can have a common view of the two chips together, as if the master device and the slave device were collocated on a single chip. Moreover, the chip-to-chip communications link can be configured with hazard checking logic, by providing ID-based ordering in accordance with the disclosed technologies, to allow bufferable writes to respond early. In contrast, non-bufferable or slave device transactions go all the way to the slave. In addition, the end-to-end application of the AXI ordering rules support barriers. A memory barrier is a type of barrier instruction which causes a communications link to enforce an ordering constraint on memory operations issued before and after the barrier instruction. This typically means that certain operations are guaranteed to be performed before the barrier, and others after. In contrast to the foregoing implementation of the AXI ordering rules in accordance with the disclosed technologies, conventional chip-to-chip communications include logic to manage the mixed AXI-"Communications protocol"-AXI ordering, where the Communications protocol can be PCIe. Such managing logic is complex and the mixed rules need to be enforced using blocking on the read or write channels, which can be undesirable in most cases.

Conventional chip-to-chip communications provide interrupt vectors for exchanging information through a communications link between a pair of master/slave devices. In general, a root complex (RC) device plays the master role. In contrast to the foregoing conventional chip-to-chip communications, the disclosed technologies enable a master device and a slave device respectively located on two different chips to communicate on a peer-to-peer basis, such that tasks can be implemented on either of the two chips. For instance, interrupts are triggered by a level-sensitive input pin of a transmitter one of the two chips, and once triggered, the interrupts are sent to a receiver one of the two chips as a transaction layer packet (TLP.) One bit in the TLP indicates an interrupt. Only the vector number is specified for the TLP, as no address is needed for sending the interrupt. Receipt of the TLP at the receiver side causes a corresponding interrupt output signal on the receiver side to go high. Additionally, the chip-to-chip communications link described in this specification is configured with bidirectional interrupts, such that each side of the communications link can send and receive 32 interrupts from the other. Moreover, an interrupt packet is sent when a corresponding input vector is high at a first chip. The link partner chip (at the other side of the communications link) clears the interrupt through a register write. If the input vector is still high or goes high again, the first chip is configured to send another interrupt packet to the link partner chip.

Further, the chip-to-chip communications link described in this specification is configured to control packet flow and to avoid deadlock. For instance, AXI has five dedicated channels, AR, AW, W, R and B, through the chip-to-chip communications link. These five channels are independent to avoid conditions corresponding to one half of a deadlock. In addition, each of the five channels has pre-reserved storage buffers for read requests, write requests and write responses. In this manner, the disclosed technologies can track the number of outstanding requests to avoid issuance of more requests when the available buffers are exceeded. Moreover, the two link partners are configured to support the same number of AXI channels, such that the chip-to-chip communications link can support a least number of outstanding requests of the two link partners. Further, the write data buffers and the read data buffers are managed using just-in-time flow control as described above in this specification. Furthermore, storage for the LL virtual channel, the BW virtual channels and the AXI channels are managed independently of each other, in accordance with the disclosed technologies.

In conclusion, the chip-to-chip communications link described in this specification supports concurrent transmissions of low latency and high bandwidth data streams while areas of link-partner chips are efficiently utilized. The disclosed technologies are implemented based on virtual channels to enable independent flow control and differential QoS through the chip-to-chip communications link. Additionally, buffers corresponding to the virtual channels are efficiently utilized to obtain low implementation cost (chip area) with respect to target performance. Power efficiency is achieved for the chip-to-chip communications link described in this specification by using ASPM to manage the link and by implementing a physical layer of the link based on MIPI M-PHY or PCIe PHY. Moreover, aspects of the disclosed technologies enable implementation of a robust and usable chip-to-chip communications link. Examples of such aspects are interrupts, memory mapping, and ordering rules that avoid introduction of additional deadlock dependencies. In addition, the chip-to-chip communications link described in this specification enables seamless inter-chip operation by supporting seamless transport of AXI.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof.

The term "controller" encompasses all apparatus, devices, and machines for processing data, including by way of example programmable electronics, a programmable hardware processor, a computer system, or multiple hardware processors or computer systems. The apparatus can include, in addition to hardware, processor firmware, or a combination thereof.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A transmitter device comprising:
 a hardware replay buffer to store a data packet, wherein the data packet includes an overhead portion and a payload portion; and
 circuitry configured to
  transmit the overhead portion, to a receiver device, including one or more overhead bits indicating a total bit count of the payload portion to be received during transmission of the payload portion;
  start the transmission of the payload portion to the receiver device through a physical serial communication link;
  receive, from a host device and prior to completion of the transmission of the payload portion, a priority data packet having a higher priority than the data packet;
  perform an interruption, before a transmission of the priority data packet, of the transmission of the payload portion in response to the receiving of the priority data packet, such that a remainder data of the payload portion in the hardware replay buffer remains to be transmitted upon resumption of the transmission of the payload portion;
  record a memory location within the hardware replay buffer corresponding to the interruption, wherein the memory location references a first bit of the remainder data of the payload portion of the data packet;
  transmit the priority data packet to the receiver device;
  after the priority data packet has been transmitted, transmit another overhead portion, to the receiver device, including one or more overhead bits indicating a bit count of the remainder data of the payload portion to be received during resumed transmission of the payload portion; and
  after transmission of the another overhead portion resume the transmission to the receiver device of the payload portion starting from the recorded memory location.

2. The transmitter device of claim 1, wherein the memory location corresponding to the interruption comprises an offset into the hardware replay buffer indicating the first bit of the remainder data.

3. The transmitter device of claim 1, wherein the circuitry comprises a register where the circuitry records the memory location corresponding to the interruption.

4. The transmitter device of claim 3, wherein the register comprises a replay start location register, and the circuitry to record comprises a current transmission location register, the replay start location register, and an end of payload portion location register, and
 is configured to transfer a value stored in the current transmission location register to the replay start register at a time of the interruption.

5. The transmitter device of claim 1, wherein the circuitry transmits, to the receiver device immediately prior to resumption of the transmission of the payload portion, one or more overhead bits indicating to the receiver device that remainder data of the payload portion is to be received.

6. The transmitter device of claim 1, wherein the circuitry is configured to
 cause another interruption in transmission of a payload portion of another data packet in response to receipt of a message from the receiver device through a physical back communications link requesting the other interruption of the transmission of the payload portion of the other data packet;
 record another memory location within the hardware replay buffer corresponding to the other interruption in the transmission to the receiver device of the payload portion of the other data packet through the physical serial communications link, wherein the other memory location references another intermediate location of the payload portion of the data packet; and resumes the transmission of the payload portion of the other data packet after a predetermined time since the receipt of the message from the receiver.

7. A system comprising:

a physical communications link through which data packets are transmitted from a first integrated circuit (IC) device to a second IC device, wherein each of the data packets includes an overhead portion and a payload portion;

a transmitter to obtain a data packet from the first IC device and to transmit the data packet through the physical communications link; and a receiver to receive the data packet transmitted through the physical communications link and to provide the data packet to the second IC device, wherein the transmitter comprises a hardware replay buffer to store the payload portion of the data packet during transmission of the data packet to the receiver through the physical communications link, and transmitter circuitry configured to transmit, to the receiver, the overhead portion including one or more overhead bits indicating a total bit count of the payload portion to be received during a transmission of the payload portion;

start the transmission of the payload portion;

receive, from a host device and prior to completion of the transmission of the payload portion, a priority data packet having a higher priority than the data packet;

perform an interruption, before a transmission of the priority data packet, of the transmission of the payload portion in response to the receiving of the priority data packet, such that a remainder data of the payload portion in the hardware replay buffer remains to be transmitted upon resumption of the transmission of the payload portion;

record a memory location within the hardware replay buffer corresponding to the interruption, where the memory location references a first bit of the remainder data of the payload portion;

transmit the priority data packet to the receiver device;

after the priority data packet has been transmitted, transmit another overhead portion, to the receiver device, including one or more overhead bits indicating a bit count of the remainder data of the payload portion to be received during resumed transmission of the payload portion; and after the another overhead portion has been transmitted, resume the transmission to the receiver device of the payload portion starting from the recorded memory location, and wherein the receiver comprises a hardware receiver buffer to store the data packet transmitted through the physical communications link, and receiver circuitry configured to count a quantity of bits received as part of the payload portion and to record the count.

8. The system of claim 7, wherein the memory location corresponding to the interruption comprises an offset into the hardware replay buffer indicating the first bit of the remainder data.

9. The system of claim 7, wherein the transmitter circuitry comprises a register where the transmitter circuitry records the memory location corresponding to the interruption.

10. The system of claim 7, wherein the transmitter circuitry causes the interruption of the transmission of the payload portion once a predetermined fraction of the payload portion is transmitted through the physical communications link after receipt of an instruction requesting the interruption.

11. The system of claim 7, wherein the transmitter comprises a second hardware replay buffer different from the hardware replay buffer to store a payload portion of the priority data packet during transmission of the priority data packet through the physical communications link, the receiver comprises a second hardware receiver buffer different from the hardware receiver buffer to store the payload portion of the priority data packet during transmission of the priority data packet transmitted through the physical communications link, the hardware receiver buffer and the second hardware receiver buffer are mapped to memory address space associated with the second IC device, and the transmitter circuitry transmits, prior to the transmissions of the payload portions of the data packet and the priority data packet, the respective overhead portions of the data packet and the priority data packet specifying respective addresses associated with the second IC device.

12. The system of claim 7, comprising:

a physical back communications link through which a message is transmitted from the receiver to the transmitter, wherein the transmitter circuitry causes the interruption in the transmission of the payload portion in response to receipt of the message from the receiver.

13. The system of claim 12, wherein the receiver transmits the message requesting the interruption of the transmission of the payload portion when a fill level of the hardware receiver buffer exceeds a predetermined level, and the transmitter circuitry resumes, after a predetermined time since the interruption, the transmission of the payload portion starting from the recorded memory location corresponding to the interruption.

14. The system of claim 12, wherein the receiver transmits the message requesting (i) the interruption of the transmission of the payload portion and (ii) retransmission of a part of the payload portion transmitted before the interruption when an error is detected in the part of the payload portion transmitted before the interruption, and the transmitter circuitry retransmits the part of the payload portion transmitted before the interruption, and then, absent a message obtained from the receiver within a predetermined time interval requesting retransmission of the payload portion, clears the hardware replay buffer.

15. A system comprising:

a physical communications link through which data packets are transmitted from a first integrated circuit (IC) device to a second IC device, wherein each of the data packets includes an overhead portion and a payload portion;

a transmitter to obtain a data packet from the first IC device and to transmit the data packet through the physical communications link, the transmitter comprising a hardware replay buffer to store the payload portion of the data packet during transmission of the data packet through the physical communications link, and transmitter circuitry configured to transmit, prior to the transmission of the payload portion, the overhead portion specifying a total bit count of the payload portion;

record a memory location within the hardware replay buffer corresponding to an interruption in the transmission of the payload portion;

transmit, prior to resumption of the transmission of the payload portion, one or more overhead bits indicating to the receiver that remainder of the payload portion is to be received; and resume the transmission of the payload portion of the data packet starting from the recorded memory location corresponding to the interruption; and a receiver to receive the data packet transmitted through the physical communications link and to provide the data packet to the second IC device, the receiver comprising a hardware receiver buffer to store the data packet transmitted through the physical communications link, and receiver circuitry configured to count a quantity of bits received as part of the payload portion and to record the count, and compare the recorded count to the specified total bit count in response to receipt of the one or more overhead bits indicating that the remainder of the payload portion is to be received.

16. The system of claim 15, wherein the transmitter circuitry causes the interruption of the transmission of the payload portion once a predetermined fraction of the payload portion is transmitted through the physical communications link after receipt of an instruction requesting the interruption.

17. A system, comprising:
(i) a physical communications link through which data packets are transmitted from a first integrated circuit (IC) device to a second IC device, wherein each of the data packets includes an overhead portion and a payload portion;
(ii) a transmitter to obtain a data packet from the first IC device and to transmit the data packet through the physical communications link, the transmitter comprising
a hardware replay buffer to store the payload portion of the data packet during transmission of the data packet through the physical communications link, and
transmitter circuitry configured to
cause an interruption in the transmission of the payload portion in response to receipt from the first IC device of a higher priority data packet to be transmitted to the second IC device through the physical communications link prior to completion of the transmission of the payload portion;
record a memory location within the hardware replay buffer corresponding to the interruption in the transmission of the payload portion; and
resume the transmission of the payload portion after completion of a transmission of the higher priority data packet through the physical communications link; and
(iii) a receiver to receive the data packet transmitted through the physical communications link and to provide the data packet to the second IC device, the receiver comprising
a hardware receiver buffer to store the data packet transmitted through the physical communications link, and
receiver circuitry configured to count a quantity of bits received as part of the payload portion and to record the count, wherein the transmitter comprises a second hardware replay buffer different from the hardware replay buffer to store a payload portion of the higher priority data packet during transmission of the higher priority data packet through the physical communications link, wherein the receiver comprises a second hardware receiver buffer different from the hardware receiver buffer to store the payload portion of the higher priority data packet during transmission of the higher priority data packet transmitted through the physical communications link;

wherein the hardware receiver buffer and the second hardware receiver buffer are mapped to memory address space associated with the second IC device, and wherein the transmitter circuitry transmits, prior to the transmissions of the payload portions of the data packet and the higher priority data packet, the respective overhead portions of the data packet and the higher priority packet specifying respective addresses associated with the second IC device, wherein the system comprises:
(iv) a physical back communications link through which the data packets are transmitted from the second IC device to the first IC device;
(v) a second transmitter to obtain a third data packet and a fourth data packet from the second IC device and to transmit the third and fourth data packets through the physical back communications link, the second transmitter comprising
a third hardware replay buffer to store a payload portion of the third data packet during transmission of the third data packet through the physical back communications link;
a fourth hardware replay buffer different from the third hardware replay buffer to store a payload portion of the fourth data packet during transmission of the fourth data packet through the physical back communications link;
second transmitter circuitry to
cause an interruption in the transmission of the payload portion of the third data packet in response to receipt from the second IC device of the fourth data packet to be transmitted through the physical back communications link prior to completion of the transmission of the payload portion of the third data packet,
record a memory location within the third hardware replay buffer corresponding to the interruption in the transmission of the third data packet, and
resume the transmission of the payload portion of the third data packet after completion of a transmission of the fourth data packet; and
(vi) a second receiver to receive the third and fourth data packets transmitted through the physical back communications link and to provide the third and fourth data packets to the first IC device, the second receiver comprising
a third hardware receiver buffer to store the third data packet transmitted through the physical back communications link,
a fourth hardware receiver buffer to store the fourth data packet transmitted through the physical back communications link, wherein the third and fourth hardware receiver buffers are mapped to memory address space associated with the first IC device, and second receiver circuitry to count another quantity of bits received as part of the payload portion of the third data packet and to record the other count, and wherein the second transmitter circuitry transmits, prior to the transmission of the payload portions of the third and fourth packets, the respective overhead portions of the third and fourth packets specifying respective addresses associated with the first IC device.

18. The system of claim 17, wherein the transmitter circuitry causes the interruption of the transmission of the payload portion once a predetermined fraction of the payload portion is transmitted through the physical communications link after receipt of an instruction requesting the interruption.

* * * * *